US010589418B2

(12) United States Patent
Gordon-Carroll et al.

(10) Patent No.: US 10,589,418 B2
(45) Date of Patent: Mar. 17, 2020

(54) PACKAGE DELIVERY TECHNIQUES

(71) Applicant: Vivint, Inc., Provo, UT (US)

(72) Inventors: Clint Huson Gordon-Carroll, Highland, UT (US); Rongbin Lanny Lin, Draper, UT (US); Brandon Bunker, Highland, UT (US)

(73) Assignee: Vivint, Inc., Provo, UT (US)

( * ) Notice: Subject to any disclaimer, the term of this patent is extended or adjusted under 35 U.S.C. 154(b) by 256 days.

(21) Appl. No.: 15/688,620

(22) Filed: Aug. 28, 2017

(65) Prior Publication Data

US 2017/0355076 A1 Dec. 14, 2017

Related U.S. Application Data

(63) Continuation-in-part of application No. 14/530,143, filed on Oct. 31, 2014, now Pat. No. 10,071,475.

(51) Int. Cl.
*B25J 9/00* (2006.01)
*B25J 9/16* (2006.01)
(Continued)

(52) U.S. Cl.
CPC .......... *B25J 9/0003* (2013.01); *A47L 9/2852* (2013.01); *A47L 9/2894* (2013.01); *B25J 9/1679* (2013.01); *B25J 11/008* (2013.01); *B25J 13/006* (2013.01); *B25J 13/08* (2013.01); *E05F 1/002* (2013.01); *G05B 15/02* (2013.01); *G05D 1/0282* (2013.01); *G06Q 10/00* (2013.01); *G06Q 10/0631* (2013.01); *G06Q 10/08* (2013.01);
(Continued)

(58) Field of Classification Search
CPC ...... B25J 9/0003; B25J 9/1679; B25J 11/008; B25J 13/08; B25J 13/006; G06Q 10/20; G06Q 10/08; G06Q 10/0631; G06Q 10/00; A47L 9/2852; A47L 9/2894; A47L 2201/04; G05B 15/02; G05B 2219/2642; G05B 2219/25168; G05B 2219/25011; G05B 2219/39001; E05Y 2800/00; E05Y 2900/132; E05F 15/611; E05F 1/002; Y10S 901/01; G05D 1/0282; G05D 2201/0215
See application file for complete search history.

(56) References Cited

U.S. PATENT DOCUMENTS 6,909,921 B1 6/2005 Bilger
8,095,238 B2 1/2012 Jones et al.
(Continued)

OTHER PUBLICATIONS

Extended European Search Report for EP Application No. 15855021.0, dated Jun. 12, 2018.
(Continued)

*Primary Examiner* — Adam R Mott
(74) *Attorney, Agent, or Firm* — Holland & Hart LLP

(57) ABSTRACT

Methods and systems are described for communicating action instructions between a home automation system and a mobile robotic device. In some embodiments, methods may comprise receiving, from a first device, information regarding a delivery of a package to a first location, determining that a mobile robotic device and the first device are part of a predetermined group of devices operating in a neighborhood network, transporting, by the mobile robotic device, the package to a drop-off location, and initiating a notification for the first device based at least in part on transporting the package.

20 Claims, 13 Drawing Sheets

(51) Int. Cl.

| | | |
|---|---|---|
| *E05F 1/00* | (2006.01) | |
| *G05D 1/02* | (2020.01) | |
| *B25J 13/00* | (2006.01) | |
| *B25J 13/08* | (2006.01) | |
| *B25J 11/00* | (2006.01) | |
| *A47L 9/28* | (2006.01) | |
| *G05B 15/02* | (2006.01) | |
| *G06Q 10/08* | (2012.01) | |
| *G06Q 10/06* | (2012.01) | |
| *G06Q 10/00* | (2012.01) | |
| *E05F 15/611* | (2015.01) | |

(52) U.S. Cl.
CPC .......... *G06Q 10/20* (2013.01); *A47L 2201/04* (2013.01); *E05F 15/611* (2015.01); *E05Y 2800/00* (2013.01); *E05Y 2900/132* (2013.01); *G05B 2219/25011* (2013.01); *G05B 2219/25168* (2013.01); *G05B 2219/2642* (2013.01); *G05B 2219/39001* (2013.01); *G05D 2201/0215* (2013.01); *Y10S 901/01* (2013.01)

(56) References Cited

U.S. PATENT DOCUMENTS

| | | | |
|---|---|---|---|
| 8,755,936 | B2 | 6/2014 | Friedman et al. |
| 10,207,868 | B1 | 2/2019 | Stubbs et al. |
| 2002/0014953 | A1 | 2/2002 | Stephens et al. |
| 2005/0064916 | A1 | 3/2005 | Ozluturk et al. |
| 2007/0112463 | A1 | 5/2007 | Roh et al. |
| 2011/0238234 | A1 | 9/2011 | Chen |
| 2013/0263034 | A1 | 10/2013 | Bruck et al. |
| 2014/0031977 | A1 | 1/2014 | Goldenberg et al. |
| 2014/0046462 | A1 | 2/2014 | Mets |
| 2014/0207282 | A1 | 7/2014 | Angle et al. |
| 2014/0254896 | A1 | 9/2014 | Zhou et al. |
| 2014/0266669 | A1 | 9/2014 | Fadell et al. |
| 2015/0120015 | A1 | 4/2015 | Fadell et al. |
| 2015/0120596 | A1 | 4/2015 | Fadell et al. |
| 2015/0145643 | A1 | 5/2015 | Fadell et al. |
| 2015/0156031 | A1 | 6/2015 | Fadell et al. |
| 2015/0310381 | A1 | 10/2015 | Lyman et al. |
| 2016/0307380 | A1* | 10/2016 | Ho ................ G07C 9/00079 |
| 2016/0331171 | A1 | 11/2016 | Jiang |
| 2017/0225336 | A1 | 8/2017 | Deyle et al. |
| 2018/0053365 | A1* | 2/2018 | Bode ................ G07C 9/00174 |
| 2018/0157259 | A1* | 6/2018 | Myslinski ............. G08B 21/18 |
| 2018/0292827 | A1* | 10/2018 | Artes ................ B25J 9/1664 |

OTHER PUBLICATIONS

Ahn, H.S. et al., "PDA-based Mobile Robot System With Remote Monitoring for Home Environment," in IEEE Transactions on Consumer Electronics, vol. 55, No. 3, pp. 1487-1495, Aug. 2009.

In-Kyu Sa et al., "Intelligent Robot Systems Based on PDA for Home Automation Systems in Ubiquitous," Cutting Edge Robotics 2010, Verdran Kordic.

PCT International Search Report for International Application No. PCT/US2015/056939, dated Mar. 25, 2016 (3 pp.).

Zak Ud Din et al., "Home Automation with Smart Robot Featuring Live Video Feed and Remotely Controlled Switches," 2013 IEEE Conference on Sustainable Utilization and Development in Engineering and Technology, (CSU DET), May 30, 2013-Jun. 1, 2013, pp. 1-6. (http://ieeexplore.ieee.org/xpl/articleDetails.jsp?arnumber=6670975).

Thibodeaux, "Riley—An Inexpensive Home Security Robot", Home Alarm Report, http://homealarmreport.com/riley-inexpensive-home-security-robot/, published May 10, 2016.

\* cited by examiner

PACKAGE DELIVERY TECHNIQUES

CROSS-REFERENCE TO RELATED APPLICATIONS

This application is a continuation-in-part of U.S. patent application Ser. No. 14/530,143, titled "SMART HOME SYSTEM WITH EXISTING HOME ROBOT PLATFORMS," filed Oct. 31, 2014, the disclosure of which is incorporated herein in its entirety by this reference.

BACKGROUND

The present disclosure, for example, relates to security and/or automation systems, and more particularly to secure package delivery techniques.

Existing home robotic systems provide users with a number of useful services, most commonly including automated vacuuming or lawn mowing performed by a mobile robotic device. The potential applications of these home robotic systems are plentiful, yet existing home robot platforms are often limited to direct user input, preset schedules, and particularly designated functionalities. For example, automated vacuuming robots are limited to vacuuming functionalities, and may only operate based on strict user inputted schedules.

As many homes and businesses are increasingly using smart home systems to monitor occupancy, temperature, and a number of other building parameters, it may be useful to provide a means for linking these smart home systems to existing mobile robot platforms such that additional home or business functionalities may be carried out by the robotic systems. Additionally, it may be beneficial to provide a means by which operation schedules for existing mobile robot platforms may be set or updated based on relevant home or property parameters, such as occupancy status, without the need for user input. For example, users may wish to limit vacuuming functionality of an automated vacuum robot system to periods of time during which the house is unoccupied. While preset scheduling functions may allow for this functionality in many instances, preset schedules may not account for unscheduled user arrivals or departures. By providing communication means between occupancy monitoring systems already in place in smart home systems and existing home robot platforms, users may be able to direct a vacuuming robot, for example, to vacuum the house only when the home is determined to be unoccupied and to return to a base or charging station before the user returns, regardless of the time at which the house is unoccupied or for what duration of time the house remains unoccupied. In this way, the integration of existing smart home systems with existing home robot platforms may serve to increase the functionality of the systems to provide additional useful features to users.

SUMMARY

With the wide-spread use of computers and mobile devices has come an increased presence of premises automation and home security products. Advancements in mobile devices allow users to monitor a home or business. Information related to secure package delivery, however, is not always readily available or incomplete and inaccurate. As a result, benefits may be realized by providing systems and methods for secure package delivery in relation to premises automation systems. Additionally, it may be advantageous to provide a means for mobile robotic devices to securely deliver packages.

Multiple audio or video devices, such as security cameras may be in wireless and/or wired communication together to receive and transmit data related to the delivery of packages and/or the association of the devices. In some examples, the network of devices may be created and maintained based on a predetermined proximity of the devices or a distance of a device to a location, such as devices associated with a house or houses in a neighborhood or a geographic area. In other examples, the network of devices may be based on each device's association with a group, such as a community network, or a group of devices running the same software application.

The devices may obtain and receive data related to information regarding delivery of a package at a first location, information regarding occupants present at the first location, information regarding an expected occupancy at the first location, and/or information regarding a secure drop-off location at or near the first location. The devices may comprise of a stationary device (such as a control panel) and a mobile robotic device (such as a drone).

An unmanned aerial vehicle (UAV) (e.g., a drone), is an aircraft without a human pilot aboard. The flight of UAVs (or drones) may operate with various degrees of autonomy: either under remote control by a human operator, or fully or intermittently autonomously, by onboard computers. Drones may have one or more cameras or other components attached, which may be used to data (e.g., audio, video, location, etc.). In some examples, the data may be stored for later viewing within the drone, or the data may be transmitted to a device associated with the drone (e.g., a control panel, a user device). Drones may be configured to fly to a specific destination, and in some cases may be used to monitor a neighborhood. In one example, each home in a neighborhood may have a drone. In some other examples, a common drone may be shared among one or more neighbors in a neighborhood and may perform security-related functions for the group of shared neighbors or may be available on demand based on detected scenarios. A UAV may be used to transport a package from a first location to a second location.

Some examples relate to systems, methods, non-transitory computer readable media and related devices for package delivery techniques. In one example, a mobile robotic device may receive, from a first device, information regarding a delivery of a package to a first location, determine that the mobile robotic device and the first device are part of a predetermined group of devices operating in a neighborhood network, transport the package to a drop-off location, and initiate a notification for the first device based at least in part on transporting the package. In some cases, the first device comprises a stationary device associated with a home automation system at the first location and the mobile robotic device comprises an unmanned air vehicle.

In one example, the system and method may include receiving, from the first device, a request to transport the package to the drop-off location, wherein transporting the package is based at least in part on receiving the request The system and method may further include receiving data related to occupancy at the first location, and determining to transport the package to the drop-off location based at least in part on the received data. In some cases, transporting the package is based at least in part on determining to transport the package.

The system and method may further include determining an expected occupancy at the first location, the expected occupancy comprising an expectancy that the first location will remain unoccupied for a threshold period of time. In some cases, transporting the package is based at least in part on determining the expected occupancy. In some examples, the expected occupancy is based at least in part on a schedule for one or more occupants of the first location.

In some examples, receiving information regarding the delivery of the package further comprises receiving of a height of the package, a length of the package, a width of the package, an estimated weight of the package, a volume of the package, an identification of the package, an image of the package, information associated with a current location of the package, or a combination thereof.

The system and method may further include retrieving one or more identifying details associated with the package from the received information, capturing an image of the package, comparing the captured image with the one or more retrieved identifying details associated with the package, and identifying the package at the first location based at least in part on the comparing.

The system and method may further include determining the drop-off location for the package based at least on a name on the package, a type of one or more items delivered, a code on the package, tracking information, instructions from the first device, instructions from an occupant of the first location, or a combination thereof.

The system and method may further include identifying a secured area within the first location as the drop-off location, deactivating at least a portion of a home automation system at the first location, transporting the package to the secured area within the first location, and reactivating at least the portion of the home automation system at the first location.

Some examples relate to systems, methods, non-transitory computer readable media and related devices for package delivery techniques. In one example, the system and method may include determining, at a first device, information regarding a delivery of a package to a first location, determining that a mobile robotic device and the first device are part of a predetermined group of devices operating in a neighborhood network, generating a request to transport the package to a drop-off location, and transmitting the request to the mobile robotic device.

In one example, the first device comprises a stationary device associated with a home automation system at the first location and the mobile robotic device comprises an unmanned air vehicle. The system and method may further include detecting a person having the package at the first location, detecting, via one or more sensors of the first device, the package being delivered at the first location, and generating the request to transport the package based at least in part on detecting the package being delivered.

The system and method may further include capturing at least one image of the person placing the package in the first location and including the at least one image in the request to transport the package to the drop-off location. The system and method may further include determining a location of an occupant of the first location and upon determining the location of the occupant is beyond a predefined distance from the first location, automatically generating the request to transport the package to the drop-off location.

Methods and systems are described for communicating action instructions between a home automation system and a mobile robotic device. In some embodiments, input data may be received at the home automation system, and the input data may be processed at the home automation system to obtain action instructions. The action instructions may then be communicated to the mobile robotic device, and the mobile robotic device may execute the received action instructions accordingly. The input data received at the home automation system may in some embodiments include user inputted data, while in other embodiments, the input data may include home security, occupancy or other property-related data received from one or more sensors in communication with the home automation system. Such property-related data may include occupancy data, or may include data collected from any one of a microphone, a motion detector, a climate detector, a touch sensor, an optical sensor, a voice recognition sensor, a security camera, a mobile device, or combinations thereof.

Upon receiving the communicated action instructions, the mobile robotic device may be operable to perform a plurality of actions, including actions for which the mobile robotic device was not originally designed. For example, the action instructions executed by the mobile robotic device may be selected from any one of opening a barrier of a home or building, vacuuming, mowing a lawn, activating or deactivating an alarm clock, relocating to the source of an alarm, activating video and/or audio recording or communication, and locating an individual or object. The mobile robotic device may further be operable to receive data input directly at the mobile robotic device, such as audio or visual data, and may communicate the data to the home automation system. This communicated data may serve to increase the functionality of the home automation system by providing mobile sensor systems. Additionally, on the basis of the received data, the home automation system may communicate updated action instructions to the mobile robotic device, or may alter parameters of other existing automated home devices, such as a thermostat or sprinkler system. In one embodiment, sensors that may be part of the home automation system, the mobile robotic device, or both, may detect that a number of visitors have visited the home, for example by way of motion or camera sensors, or by door sensors. On the basis of this data, the home automation system may determine that additional vacuuming is required, without any input needed from the user, and may transmit action instructions to the mobile robotic device accordingly.

Some embodiments may include receiving, at the home automation system, one or more data patterns, wherein the data patterns may comprise user patterns of behavior. Using these user patterns of behavior, an operation rule may be obtained based on the one or more data patterns, the operation rule comprising set action instructions. The operation rule may then be communicated to the mobile robotic device, wherein the mobile robotic device may execute the set action instructions comprising the received operation rule. For example, the home automation system may receive data patterns indicative of the user's home arrival patterns, such as every weekday at 5:30 pm. On the basis of these data patterns, the home automation system may obtain an operation rule, specifically that the front door should be opened on weekdays at 5:30 pm. Set action instructions based on the operation rule may be communicated to the mobile robotic device, which may execute the received operation rule by opening the front door on weekdays at 5:30 pm.

In some embodiments, the operation rule and/or action instructions may be updated based on updated input data received at the home automation system or the mobile robotic device, such that the mobile robotic device may execute the updated action instructions. In the example provided above, the operation rule may be updated based on data received, for example, from a motion detector or security camera indicating that the user has not yet arrived home at 5:30 pm, such that the mobile robotic device may be instructed not to open the front door until further action instructions are received. In this way, home safety may be ensured, and the mobile robotic device may be operable to perform functions beyond the scope of a preset schedule.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

Figure 1:
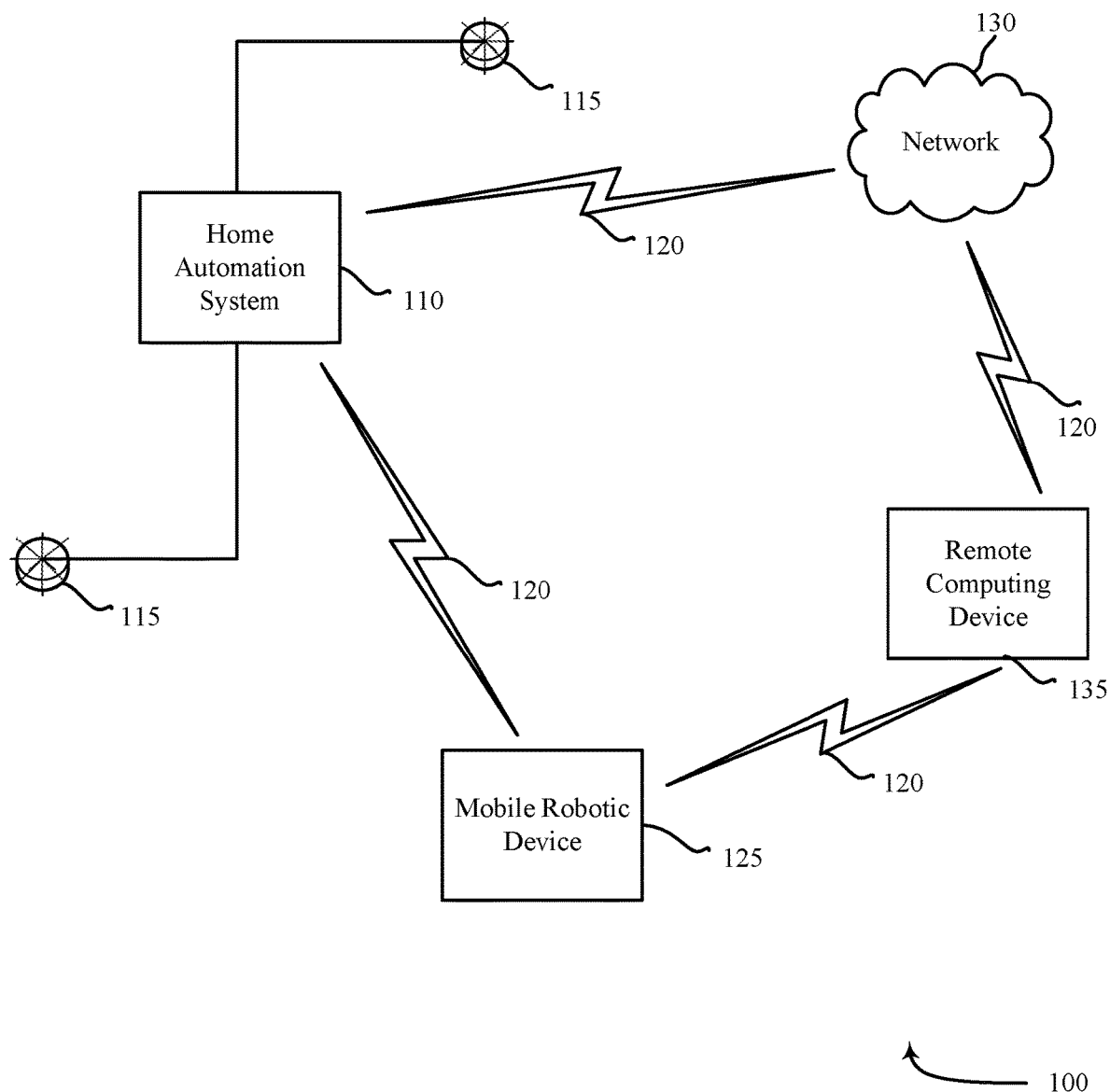
FIG. 1 is a block diagram of an example mobile robotic device communication system in accordance with various embodiments.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein may relate to facilitating communication between a home automation system and a mobile robotic device. More specifically, the systems and methods described may relate to a means for monitoring home automation data and obtaining action instructions therefrom, and communicating the action instructions to the mobile robotic device for execution.

Additionally, it may be advantageous to provide a means for utilizing existing home robot platforms to perform tasks not originally intended by the manufacturer, without the need for costly or complicated installation of processing systems on the robots. For example, an existing home vacuuming robot may be integrated with a smart home system in order to receive action instructions from the smart home system that enhance the robot's operability beyond merely vacuuming. Because the action instructions may be originated at the smart home system, and in view of already existing wireless receiving capabilities in the vacuuming robot platform, limited retrofitting of the robot, such as with costly processors, may be required. This may provide an ease of use and conservation of cost for the consumer, while still achieving increased functionalities for existing smart home systems and home robot platforms.

The systems and methods described herein relate generally to package delivery techniques associated with a mobile audio/video device, such as a UAV (e.g., drone). Currently, several drawbacks exist with the current delivery model. For example, the typical delivery to a home or residence includes the delivery person approaching the front door, knocking on the door and/or ringing the doorbell, waiting for an occupant to answer the door, and leaving the package near the doorstep if no one answers the door. In most cases, the delivery person simply knocks on the door and leaves the package on the door step without waiting for someone to answer the door. This delivery model leaves the package vulnerable to theft as the package may be easily visible from the street. Theft of delivered packages from door steps is a significant problem, including during the holiday season when the number of package deliveries increases dramatically.

Another issue with the current delivery model is that some packages require a signature in order for the delivery person to release custody of the package. In these cases, the delivery person will wait for someone to answer the door after knocking. However, if no one answers the door, the delivery person may leave a note indicating that an attempt was made to deliver the package and that the delivery person will return on a specified day to attempt again to deliver the package. If no one answers the door on the second delivery attempt, the delivery person will leave a note indicating that the recipient may pick up the package at a designated delivery location. This current structure results in additional costs and inconvenience to both delivery companies as well as the recipients of the packages, and leads to additional complications and problems.

Accordingly, the present systems and methods resolve these and other issues by enabling the secure delivery of packages, in some cases to a designated drop-off location. The drop-off location may be located within the premises where the package was delivered. In some other examples, the drop-off location may be a common secure drop-off location for a neighborhood. Even when no one is home or present at a location (e.g., a business, a home), a delivery person may be enabled to deliver a package to a designated area of a premises and a mobile robotic device (e.g., drone) may be configured to pick the package up and deliver it to a secure drop-off location.

In some examples, a request to transport a package may be requested from a first device of a first member of a community networking group to a second device of a second member of the community networking group. In some examples, the first device and the second device may be wirelessly networked with other devices within a predetermined distance or at a predetermined location. In other examples, the devices may be wirelessly networked with other devices that have opted-into the community networking group. In some examples, the members of the community networking group may be customers of the same security and automation solution provider. In some other examples, the members of the community networking group may be customers of two or more different security and automation solution providers.

In one embodiment, the first device may be a stationary device (e.g., home automation system, control panel) and the second device may be a mobile robotic device (e.g., a drone, an unmanned aerial vehicle, a self-flying camera). In some examples, the mobile robotic device and the first device may belong to the same user. In such examples, upon receiving a package delivery notification for a user, the mobile robotic device (e.g., common neighborhood drone) may query the first device for occupancy data related to the user. For example, if a package delivery is scheduled for a user, the mobile robotic device may query one or more sensors (e.g., a motion sensor, indoor camera) or one or more devices (e.g., a control panel) to determine if the user is at home. Upon determining that the user is not at home (or that a specific user is not at home, such as a parent or adult of the home), the mobile robotic device may deliver the package to a neighbor of the user. In some examples, a neighborhood may have a secure neighborhood drop spot. Upon determining that the user is not present at home, the mobile robotic device may deliver the package (or may carry the delivered package) to the secure neighborhood drop spot. In some cases, the mobile robotic device may notify the user that the package is securely delivered.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is a block diagram illustrating one embodiment of a mobile robotic device communication system 100 in which the present systems and methods may be implemented. In some embodiments, the mobile robotic device communication system 100 may include a home automation system 110, one or more sensor units 115, a mobile robotic device 125, a network 130, and a remote computing device 135. The home automation system 110 may communicate via wired or wireless communication links 120 with one or more of the mobile robotic device 125 and the network 130. The network 130 may communicate via wired or wireless communication links 120 with the remote computing device 135. In alternate embodiments, the network 130 may be integrated with the remote computing device 135, such that separate components are not required.

Although defined as a home automation system, component 110 may alternatively comprise a business automation system or any other system operable to monitor and control parameters for buildings or properties.

Home automation system 110 may be operable to both control aspects of a property as well as to receive and display notifications regarding monitored activity of a property. Examples of the home automation system 110 may include a dedicated home automation computing device (e.g., wall-mounted controller), a personal computing device (e.g., laptop, desktop, etc.), a mobile computing device (e.g., tablet computing device, smartphone, etc.), and the like.

Examples of the sensor units 115 may include any one of a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, voice sensor, and the like. Sensor units 115 may represent one or more separate sensors or a combination of two or more sensors in a single sensor device. For example, sensor unit 115 may represent one or more camera sensors and one or more motion sensors connected to home automation system 110. Additionally or alternatively, sensor unit 115 may represent a combination sensor such as both a camera sensor and a motion sensor integrated in the same sensor device. Although sensor units 115 are depicted as connecting directly to home automation system 110, sensor units 115 may alternatively connect to home automation system 110 via a wired or wireless connection link 120, or via network 130. Additionally or alternatively, sensor units 115 may be integrated with a home appliance or fixture such as a light bulb. In some embodiments, sensor unit 115 may include an accelerometer to enable the sensor unit 115 to detect a movement. In some embodiments, sensor unit 115 may include a wireless communication device enabling sensor unit 115 to send and receive data and/or information to and from one or more devices. Additionally or alternatively, sensor unit 115 may include a GPS sensor to enable sensor unit 115 to track a location of sensor unit 115. Sensor unit 115 may include a proximity sensor to enable sensor unit 115 to detect proximity of a person relative to a predetermined distance from a dwelling (e.g., geo-fencing). In some embodiments, sensor unit 115 may include one or more security detection sensors such as, for example, a glass break sensor, a motion detection sensor, or both. Additionally or alternatively, sensor unit 115 may include a smoke detection sensor, a carbon monoxide sensor, or both.

Mobile robotic device 125 may be any existing mobile robotic device available for use in home or business applications. For example, mobile robotic device 125 may include a drone, an unmanned air vehicle, an iRobot Roomba®, Scooba®, Braava®, 110 FirstLook®, or Ava®, or a Husqvarna Automower®. In order to receive action instructions and/or input data, the mobile robotic device 125 may be retrofitted with a wired or wireless transceiver (not shown), as well as one or more sensor units (not shown). Alternatively, in mobile robotic devices already having Wi-Fi or other communication capabilities, an additional transceiver may not be necessary. With the addition of these components, existing mobile robotic devices 125 may become operable to receive action instructions from home automation system 110 or remote computing device 135, and may additionally be operable to receive and process input data from one or more sensors positioned on or integrated with the mobile robotic devices 125. The mobile robotic device 125 may forward the sensed data to the home automation system 110, such that the home automation system 110 may provide updated action instructions to the mobile robotic device 125. Alternatively, the mobile robotic device 125 may receive input data from the one or more sensors positioned on or integrated with the mobile robotic device 125, and may obtain and execute action instructions locally based on input data, without the need for interaction with the home automation system 110.

In some embodiments, mobile robotic device 125 may communicate input data received from one or more sensors positioned on the mobile robotic device 125 to the home automation system 110 or remote computing device 135 in real-time such that a user may make decisions regarding action instructions accordingly. For example, a Roomba® having a video camera attached thereon may send video data to a user's smart phone showing that a room is badly cluttered, such that the user may elect not to vacuum the room at that time, and may send action instructions to the Roomba® directing the mobile robotic device 125 to terminate any scheduled vacuuming operations and return to its designated base or charging station. In some embodiments, input data from sensors positioned on the mobile robotic device 125 may be transmitted to the home automation system 110 at the initiative of the mobile robotic device 125, or in other embodiments the home automation system 110 may request transmission of input data from the mobile robotic device 125.

In other embodiments, a user or home automation system 110 may communicate action instructions to a mobile robotic device 125 beyond the operability of the mobile robotic device's 125 original manufacturer-selected functionalities. For example, upon receiving an alert at the home automation system 110 via one or more sensor units 115 that a window has been shattered, home automation system 110 may communicate an action instruction to an Automower® fitted with a video camera or motion detector to relocate to the source of the broken window and collect any relevant data, such as video or movement data indicating that a burglar is entering the home, and convey that data to the home automation system 110 or remote computing device 135.

In some embodiments, multiple existing robotic platforms may be used in concert. For example, a Life Alert® signal received at home automation system 110 or remote computing device 135 indicating that, for example, an elderly home occupant has fallen, may prompt an action instruction. The action instruction may be communicated to, for example, a 110 FirstLook® mobile robotic device 125 having a heartbeat sensor, breathing sensor, brain wave sensor, movement sensor, voice sensor, video camera or the like to move throughout the home or property to locate the source of the alert and convey any relevant occupant vital data to the home automation system 110 or remote computing device 135. In other embodiments, the mobile robotic device 125 may be sent to investigate the condition of a home occupant based on motion sensor data, rather than requiring a Life Alert® signal to be activated. For example, a motion sensor may detect that an occupant has not moved from a position for over a predetermined period of time, such that injury is suspected, and may subsequently prompt an action instruction in a mobile robotic device 125 to relocate to the occupant and gather relevant data about the occupant's condition, to be conveyed to the home automation system 110 or remote computing device 135.

In some embodiments, existing mobile robotic devices 125 may be used in concert with existing home devices, fixtures, or appliances by transmitting commands via wireless signals to the devices, appliances, or fixtures. For example, a mobile robotic device 125 may navigate to within Bluetooth range of a device having Bluetooth connectivity, and may turn the device, such as a speaker system, off or on via Bluetooth-transmitted commands. In other examples, a mobile robotic device 125 may transmit a command to, for example, a television via a Wi-Fi connection to turn off or on. While existing smart home systems may be operable to perform the latter task, in areas of the home that might be Wi-Fi "dead zones," the mobile robotic device may be operable to extend the Wi-Fi functionality of the smart home system.

In further embodiments, existing mobile robotic devices 125 having speakers and/or microphones may be used in conjunction with action instructions communicated from home automation system 110 or remote computing device 135 to serve as mobile intercom systems or alarm clocks, wherein the action instructions may send the mobile robotic device 125 to a child's room to wake the child up by playing music or other sounds. In this way, the functionality of existing mobile robotic devices may be extended beyond their original manufacturer-selected capabilities to provide a multitude of useful services to users via a home automation system 110 or remote computing device 135.

Remote computing device 135 may be a custom computing entity configured to interact with sensor units 115 via network 130. In other embodiments, remote computing device 135 may be a general purpose computing entity such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

In some embodiments, the one or more sensor units 115 may be sensors configured to conduct periodic or ongoing automatic measurements related to home security, environment, occupancy, or other relevant property-related data. Each sensor unit 115 may be capable of sensing multiple home security, environment or occupancy data parameters, or alternatively, separate sensor units 115 may monitor separate home data parameters. For example, one sensor unit 115 may detect occupancy data via a motion detector and/or security camera, while another sensor unit 115 (or, in some embodiments, the same sensor unit 115) may detect climate via a moisture sensor or ultra violet (UV) sensor.

Data gathered by the one or more sensor units 115 may be communicated to the home automation system 110, which may be, in some embodiments, a thermostat or other wall-mounted input/output display. The home automation system 110 may process the data received from the one or more sensor units 115 to obtain action instructions. In alternate embodiments, a user may input data directly at the home automation system 110 or at remote computing device 135, such that action instructions may be obtained based wholly or in part on user inputted data. Action instructions obtained at the home automation system 110 may then be communicated via a wired or wireless communication link 120 to the mobile robotic device 125 or to the network 130. Action instructions communicated to network 130 may be communicated via wired or wireless communication link 120 to remote computing device 135, and may in turn be communicated to mobile robotic device 125 via wired or wireless communication link 120. Action instructions received at mobile robotic device 125 may then be executed by mobile robotic device 125. In some embodiments, described in more detail below, inputted data may also be collected by mobile robotic device 125 and may be communicated via wired or wireless communication link 120 to remote computing device 135 and/or home automation system 110.

In some embodiments, home automation system 110 may communicate with remote computing device 135 via network 130. Examples of networks 130 include cloud networks, local area networks (LAN), wide area networks (WAN), virtual private networks (VPN), wireless networks (using 802.11, for example), and/or cellular networks (using 3G and/or LTE, for example), etc. In some configurations, the network 130 may include the Internet. In some embodiments, a user may access the functions of home automation system 110 from remote computing device 135. For example, in some embodiments, remote computing device 135 may include a mobile application that interfaces with one or more functions of home automation system 110.

Figure 2:
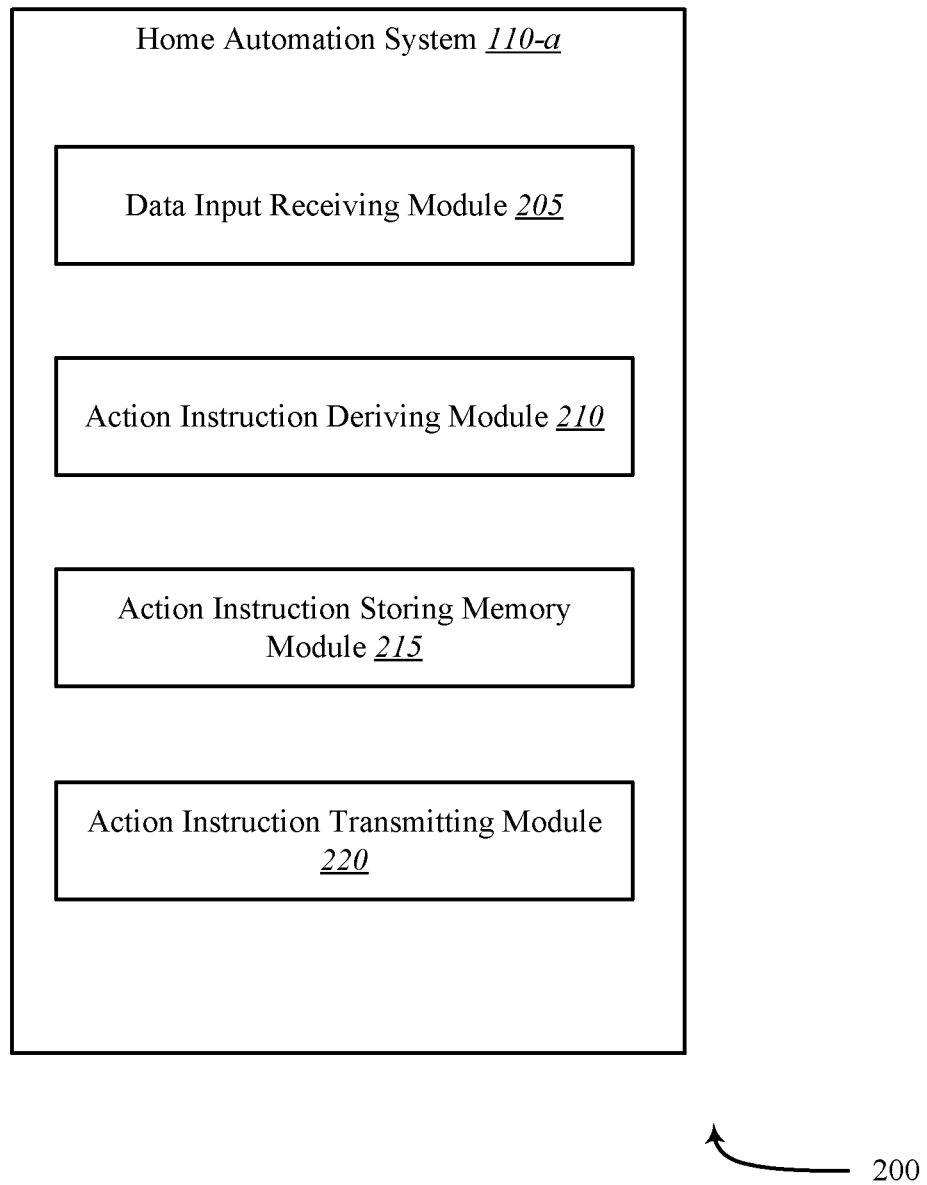
FIG. 2 is a block diagram of one example of a home automation system of the system of FIG. 1.

FIG. 2 shows a block diagram 200 that includes home automation system 110-a, which may be an example of one or more aspects of home automation system 110 of FIG. 1, for use in receiving input data and communicating action instructions derived based on the inputted data to the mobile robotic device 125 of FIG. 1. In some examples, home automation system 110-a may include a data input receiving module 205, an action instruction deriving module 210, an action instruction storing memory module 215, and an action instruction transmitting module 220. Each of these components may be in communication with each other.

The components of home automation system 110-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structure/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Home automation system 110-a may be configured to receive data relating to home security, environment, occupancy, or other data relevant to the home or property via data input receiving module 205. As described above with reference to FIG. 1, home security, environment, occupancy or other relevant property data may be collected by one or more sensor units 115, and may be communicated to data input receiving module 205. Alternatively or in addition, home security, etc. data may be inputted directly by the user into the home automation system 110-a via data input receiving module 205, or may be inputted at remote computing device 135 and communicated to data input receiving module 205 via wired or wireless communication link 120 and network 130, as shown in FIG. 1. In some embodiments, described in more detail below, data may be received at data input receiving module 205 from mobile robotic device 125 via wired or wireless communication link 120. In some embodiments, one or more data patterns comprising user patterns of behavior may be received at data input receiving module 205. Again, the data patterns may be received from one or more sensor units 115, or may be inputted directly by the user into the home automation system 110-a at data input receiving module 205, or alternatively may be inputted at remote computing device 135 and may be communicated to data input receiving module 205 via wired or wireless communication link 120 and network 130.

Data received at data input receiving module 205 may be communicated to action instruction deriving module 210, which may derive action instructions based on the received input data. Where one or more data patterns are received at action instruction deriving module 210 from data input receiving module 205, an operation rule may be derived by action instruction deriving module 210, the operation rule comprising set action instructions determined based on the received one or more data patterns. For example, where data input receiving module 205 receives data patterns either via one or more sensor units 115 or via direct user input regarding occupancy, action instruction deriving module 210 may derive an operation rule indicating that robotic alarm clocks should only be activated when users are home during the week, and should remain deactivated when the users are away from home on the weekends.

In one embodiment, data input receiving module 205 may determine information regarding a delivery of a package to a first location. In some cases, determining the information regarding a delivery of a package to a first location may include receiving information regarding a delivery of a package to a premises such as home or business. The information received may include a delivery company name, delivery person information (e.g., delivery person name, photo ID, work ID, etc.), a unique code associated with the company (e.g., barcode, QR code, etc.), a unique code associated with the delivery person, scheduled date of delivery, an expected time of delivery (e.g., a window of time), tracking number, number of packages, weight of each package, dimensions of each package, etc.

In some cases, data input receiving module 205 may detect a person having the package at the first location. As an example, data input receiving module 205 may detect a delivery person arriving at the premises. The delivery person may be detected in conjunction with one or more cameras located at the premises. In some examples, data input receiving module 205 may detect a package being delivered at the first location. For example, the first location may be a porch of a house, a back door of a house, or a garage of a house. In some cases, data input receiving module 205 may determine a location of a delivery vehicle. The location of the delivery vehicle may be determined by a location device on the delivery vehicle such as a GPS, the delivery person providing information regarding his or her location (e.g., present delivery location, next delivery location, etc.), and the like. In some cases, data input receiving module 205 may receive information indicating that the delivery vehicle is at and/or within a predefined distance of the premises. In some examples, data input receiving module 205 may be configured to recognize a delivery vehicle, a delivery uniform, a delivery company logo, etc. Thus, in some cases, upon receiving information indicating the delivery vehicle is at or near the premises, data input receiving module 205 activate at least one camera to capture at least one image of the person placing the package in the first location. In some examples, data input receiving module 205 may scan captured images to detect a delivery vehicle and/or delivery person.

In some cases, the delivery person may ring a doorbell and/or knock on the door of the premises and/or trigger a motion detector. Upon detecting the delivery person at the door, a camera associated with data input receiving module 205 may capture a photo and/or video image of delivery person. In some examples, data input receiving module 205 may compare a captured image to an image of the delivery person provided by the delivery company (e.g., a photo ID of the delivery person). In some cases, an automated system (e.g., a prerecorded message, a voice simulated message, etc.) may request that the delivery person stare into the camera in order to capture an image with a similar viewpoint as that of an image of the delivery person provided by the delivery company. Additionally, or alternatively, a delivery person may be instructed to place an identification card in relation to the camera. The identification card may include a photo ID of the delivery person, a delivery person name, a company name, a company logo, a unique code (e.g., barcode, QR code, etc.), short-range communication capabilities (e.g., radio frequency ID (RFID), near-field communication (NFC), etc.), and the like. Upon receiving data from and/or capturing an image of the identification card, data input receiving module 205 may use any combination of the captured information (e.g., photo ID, name, barcode, RFID, etc.) to verify the identity of the delivery person. In some cases, such as when the delivery person arrives outside an expected period of time, additional verification may be requested and performed by one or more devices.

In some embodiments, data input receiving module 205 may provide instructions to the delivery person regarding where to place the delivery at the premises. In some cases, the instructions may be provided to the delivery person upon detecting the delivery person arriving at the premises. For example, the delivery person may knock on the door or ring the doorbell of the premises. Upon detecting the delivery person at the door, a communication device (e.g., a speaker at the door that is part of an intercom system of the premises) may provide instructions to the delivery person. The instructions may include pre-recorded messages, digital text-to-speech messages, and the like. In some embodiments, upon detecting the arrival and/or verifying the identity of the delivery person, data input receiving module 205 may send a temporary access code to a device of the delivery person (e.g., smart phone, tablet computing device, BLUETOOTH® device, etc.). The temporary access code may be used to unlock the front door, to open the garage door wirelessly, or to open the garage door via a keypad outside the garage door.

Action instructions derived by action instruction deriving module 210 may then be communicated to action instruction storing memory module 215. In some examples, action instruction deriving module 210 may determine a location of an occupant of the first location. For example, upon detecting a delivery of a package, action instruction deriving module 210 may query one or more occupancy sensors in a home to determine a presence of occupants. In one embodiment, action instruction deriving module 210 may determine a location and/or heading of an occupant of the premises. For example, action instruction deriving module 210 may determine a distance between the premises and the occupant, a heading of the occupant, and the like. Based on the location and heading of the occupant in relation to previously detected patterns, action instruction deriving module 210 may determine that the occupant is at the premises, heading away from the premises, heading to the premises, etc. Upon determining the location of the occupant is beyond a predefined distance of the premises, action instruction deriving module 210 may automatically generate a request to transport the package to a drop-off location. In one embodiment, action instruction deriving module 210, in conjunction with a camera, may automatically select and designate a delivery area and/or a delivery location within a drop-off location. For example, upon analyzing one or more areas of the premises, action instruction deriving module 210 may designate a garage of the premises as the drop-off location. In some cases, action instruction deriving module 210 may select a delivery area configured by the occupant to be the default delivery area. In some examples, action instruction deriving module 210 may be configured to select a drop-off location at a second location different from the premises. Additionally, or alternatively action instruction deriving module 210 may store information regarding one or more previous deliveries and analyze the stored information to detect one or more patterns associated with a delivery. Based on the one or more detected patterns, action instruction deriving module 210 may select a drop-off location and/or delivery location within the drop-off location.

In some cases, action instruction deriving module 210 may request the occupant of the premises to select a drop-off location (e.g., delivery area) and to specify a location within the drop-off location where the package is to be transported. The occupant may designate the drop-off location by selecting an option presented on a control panel, selecting a location via a smart phone (e.g., mobile computing device), speaking a voice command received and interpreted by premises automation controller, and the like. In some cases, the occupant may specify the location within the drop-off location where the package is to be placed by placing a marker at the specific location. For example, after selecting a garage of the premises as the drop-off location, the occupant may place a sign, decal, or other type of indicator on the floor and/or wall of the garage to specify the location of where to place the delivery. Additionally, or alternatively, the occupant may direct a light emitting device (e.g., light emitting diode (LED), LASER, etc.) to shine a light on the specific location of where to place the delivery. For example, the light emitting device may shine a focused beam of light (e.g., similar to a laser pointer) on to the delivery location. In some cases, the drop-off location may be at a location different from the first location. For example, cases, action instruction deriving module 210 may identify a secure drop-off location (such as a community drop box) and may include the location in the request to transport the package. Further, cases, action instruction deriving module 210 may include one or more images associated with the package (e.g., identity of the delivery person, image of the package, image of the location where the package is left by the delivery person) in the request to transport the package.

In some examples, action instruction deriving module 210 may identify a mobile robotic device for transporting the package to the drop-off location. A mobile robotic device may be a drone, a UAV or any other mobile device capable of transporting the package from the first location to the drop-off location. As part of identifying the mobile robotic device, action instruction deriving module 210 may determine that the mobile robotic device and the first device (e.g., home automation system 110-*a*) are part of a predetermined group of devices operating in a neighborhood network. In some examples, the mobile robotic device (e.g., mobile robotic device 125-*a*) may be wirelessly networked with other devices (e.g., other home automation systems 110-*a* and mobile robotic devices 125-*a*) within a predetermined distance or at a predetermined location. In other examples, the devices may be wirelessly networked with other devices that have opted-into the community networking group. In some examples, the members of the community networking group may be customers of the same security and automation solution provider. In some other examples, the members of the community networking group may be customers of two or more different security and automation solution providers. Based on the data received and/or transmitted, the devices may send commands to other devices to take an action, send an alert, perform other operations.

In some cases, action instruction deriving module 210 may generate one or more notifications based on the received information regarding a delivery of a package to the drop-off location. For example, action instruction deriving module 210 may receive an indication of the delivery of the package from mobile robotic device 125-*a*. The indication may include a message confirming the delivery of the package at the drop-off location. Upon receiving the indication, action instruction deriving module 210 may notify the occupant that the package has been securely delivered to the drop-off location (e.g., drop-off location specified by the occupant). In one embodiment, upon detecting the occupant approaching the premises subsequent to the delivery of the package, action instruction deriving module 210 may generate and send a reminder notification. The reminder notification may include at least one element of a reminder that the package is delivered at the secured drop-off location, information regarding the delivery of the package, and one or more photo and/or video images of the delivered package.

Action instruction storing memory module 215 may include random access memory (RAM) or read-only memory (ROM). Action instruction storing memory module 215 may store computer-readable, computer-executable software code containing instructions that are configured to, when executed, cause action instruction transmitting module 220 to perform various functions described herein for communicating, for example, action instructions. Alternatively, the software code may not be directly executable by action instruction transmitting module 220, but may be configured to cause the home automation system 110-*a* (e.g., when compiled and executed) to perform various of the functions described herein.

Action instruction transmitting module 220 may include a modem configured to modulate packets and provide the modulated packets to antennas (not shown) for transmission, and to demodulate packets received from the antennas. Action instruction transmitting module 220 may transmit the request to the mobile robotic device. For example, the request may include instructions to transport a package to a secure drop-off location. In some examples, the secure drop-off location may be within the premises where the package was delivered. In some other examples, the secure drop-off location may be at a second location different from the premises where the package was delivered. Additionally or alternatively, the second location may be a common drop-off location for members of the community networking group. Action instruction transmitting module 220 may, in some examples, be implemented as one or more transmitter modules and one or more separate receiver modules (not shown). Action instruction transmitting module 220 may support action instruction-related communications. Action instruction transmitting module 220 may be configured to communicate, bi-directionally, via antennas and communication link 120 (as shown in FIG. 1), with, for example, mobile robotic device 125 and/or remote computing device 135 (via network 130). In some embodiments, communications through action instruction transmitting module 220 may be coordinated, at least in part, by a communications module (not shown).

Figure 3:
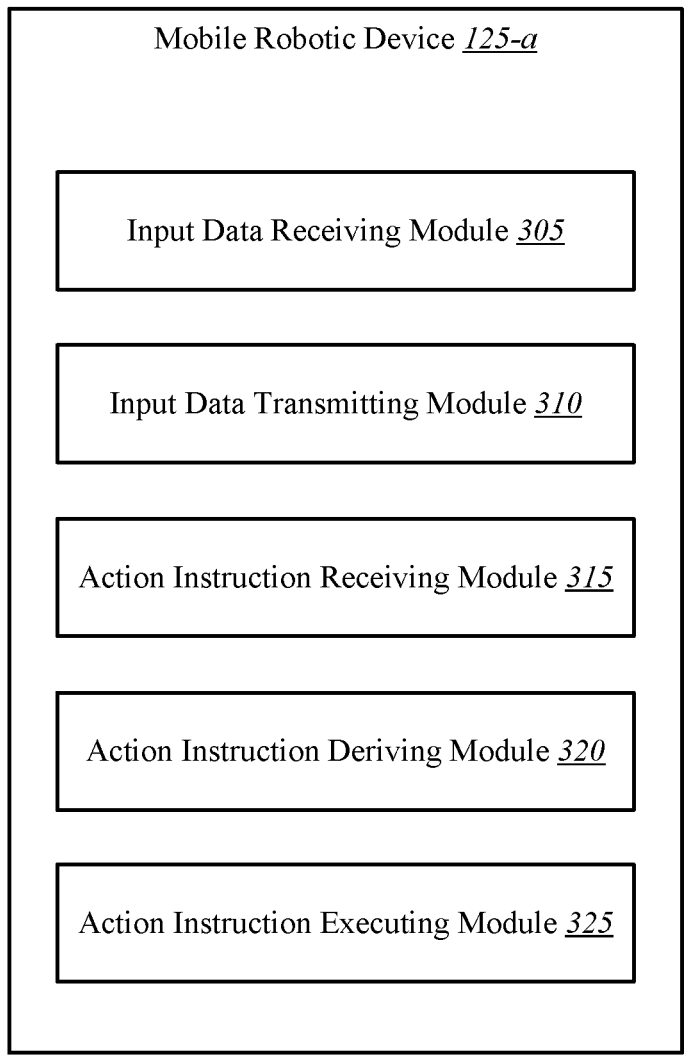
FIG. 3 is a block diagram of an exemplary mobile robotic device as shown in the system of FIG. 1.

FIG. 3 shows a block diagram 300 that includes mobile robotic device 125-*a*, which may be an example of one or more aspects of mobile robotic device 125 of FIG. 1, for use in receiving action instructions communicated from home automation system 110 of FIG. 1 and executing the received action instructions. In some embodiments, mobile robotic device 125-*a* may also be operable to receive inputted data from one or more sensors (not shown) associated with the mobile robotic device 125-*a*, and transmit the inputted data to the home automation system 110 of FIG. 1. In other embodiments, mobile robotic device 125-*a* may be operable to process inputted data to obtain action instructions. In some examples, mobile robotic device 125-*a* may include an input data receiving module 305, an input data transmitting module 310, an action instruction receiving module 315, an action instruction deriving module 320, and an action instruction executing module 325. Each of these components may be in communication with each other.

Input data receiving module 305 may be operable to receive data from a plurality of sensors (not shown) positioned on or integrated with mobile robotic device 125-*a*. For example, mobile robotic device 125-*a* may comprise any one or more of a camera sensor, motion sensor, climate or temperature sensor, audio sensor, carbon monoxide sensor, smoke sensor, accelerometer, GPS sensor, Wi-Fi positioning system sensor, capacitance sensor, radio frequency sensor, near-field sensor, heartbeat sensor, breathing sensor, oxygen sensor, carbon dioxide sensor, brain wave sensor, voice sensor, and the like. In some cases, input data receiving module 305 may be configured to receive data from home automation system 110-*a*. Input data receiving module 305 may be configured to receive information regarding a delivery of a package to a first location from a first device (e.g., home automation system 110-*a*). In one embodiment, as previously discussed, input data receiving module 305 may receive information regarding a delivery of a package to the first location. In some cases, the information received may include a delivery company name, delivery person information, a unique code associated with the company (e.g., barcode, QR code, etc.), a unique code associated with the delivery person, scheduled date of delivery, an expected time of delivery (e.g., a window of time), tracking number, number of packages, weight of each package, dimensions of each package, etc. In some examples, input data receiving module 305 may receive information regarding details of the package from the home automation system 110-*a*. For example, the details may further comprises receiving of a height of the package, a length of the package, a width of the package, an estimated weight of the package, a volume of the package, an identification of the package, an image of the package, information associated with a current location of the package, or a combination thereof. In some cases, input data receiving module 305 may receive data related to a location of a delivery vehicle, an identification of the delivery vehicle, a delivery uniform, a delivery company logo, etc.

Input data receiving module 305 may collect data gathered by the one or more sensors of the mobile robotic device 125-*a*, and may communicate the collected data to input data transmitting module 310. Input data transmitting module 310 may in turn communicate the sensor-gathered data to home automation system 110 of FIG. 1. Home automation system 110 may then process the received data in order to obtain new or updated action instructions. The new or updated action instructions may then be communicated to mobile robotic device 125-*a* at action instruction receiving module 315.

Action instructions received at action instruction receiving module 315 may then be communicated to action instruction executing module 325, which may be configured to implement the action instructions received on the mobile robotic device 125-*a*. For example, in one embodiment, mobile robotic device 125-*a* may have received at action instruction receiving module 315 action instructions from home automation system 110 of FIG. 1 directing mobile robotic device 125-*a* to mow the lawn. The "mow the lawn" action instructions received at action instruction receiving module 315 may be communicated to action instruction executing module 325, which may initialize the lawn mowing functionality of the mobile robotic device 125-*a*. During the course of carrying out the lawn mowing functionality of mobile robotic device 125-*a*, input data receiving module 305 may receive data from one or more sensors (not shown) on mobile robotic device 125-*a* indicating that it has begun to rain. Data indicating that it is raining may be communicated to input data transmitting module 310, which may transmit the climate data to home automation system 110 of FIG. 1. Home automation system 110 may receive the climate data and may process the data to obtain new or updated action instructions indicating that the mobile robotic device 125-*a* should cease the lawn mowing operation. The action instructions may be communicated to the mobile robotic device 125-*a* via wireless connection link 120 (as shown in FIG. 1), and may be received by action instruction receiving module 315, which may communicate the action instructions to action instruction executing module 325. Action instruction executing module 325 may then terminate the lawn mowing operation of the mobile robotic device 125-*a*. In some embodiments, the mobile robotic device 125-*a* may then return to a designated base or charging station until further action instructions are received.

In alternate embodiments, mobile robotic device 125-*a* may have received at action instruction receiving module 315 action instructions from home automation system 110 of FIG. 1 directing mobile robotic device 125-*a* to mow the lawn. The "mow the lawn" action instructions received at action instruction receiving module 315 may be communicated to action instruction executing module 325, which may initialize the lawn mowing functionality of the mobile robotic device 125-*a*. During the course of carrying out the lawn mowing functionality of mobile robotic device 125-*a*, input data receiving module 305 may receive data from one or more sensors (not shown) on mobile robotic device 125-*a* indicating that it has begun to rain. Data indicating that it is raining may be communicated to action instruction deriving module 320 within the mobile robotic device 125-*a*. In some examples, action instruction receiving module 315 may receive a request to transport the package to a secure drop-off location. In some examples, action instruction receiving module 315 may receive data related to occupancy at the first location.

Action instruction deriving module 320 may process the received climate data and may obtain a new action instruction indicating that the mobile robotic device 125-*a* should cease the lawn mowing operation. In some other examples, action instruction deriving module 320 may determine a location of an occupant of the first location in conjunction with home automation system 110-*a*. For example, upon receiving a notification of a delivery of a package, action instruction deriving module 320 may query one or more occupancy sensors in a home (e.g., first location) to determine a presence of occupants. In one embodiment, action instruction deriving module 320 may determine an expected occupancy at the first location. In some cases, the expected occupancy may include an expectancy that the first location will remain unoccupied for a threshold period of time. In one example, the expected occupancy may be based on a schedule of the occupant. For example, the schedule may be based on a pattern of occupancy. Additionally or alternatively, action instruction deriving module 320 may determine a future location of an occupant of the premises. For example, action instruction deriving module 320 may determine a distance between the premises and the current location of the occupant. Based on the current location and information regarding a direction where the occupant is heading, action instruction deriving module 320 may determine that the occupant is heading away from the premises, heading to the premises, etc. In some examples, mobile robotic device 125-*a* may be configured to fly a threshold distance around the premises to locate the occupant of the premises.

Upon determining the location of the occupant is located beyond a predefined distance, action instruction deriving module 320 may automatically determine to transport the package to the drop-off location based on the received location of the occupant. In some examples, action instruction deriving module 320 may retrieve identifying details associated with the package from the received information (e.g., information received from the home automation system 110-*a*). In some examples, action instruction deriving module 320 may receive a request to transport the package from home automation system 110-*a*. Upon receiving the request, action instruction deriving module 320 may determine that the mobile robotic device 125-*a* and the first device (e.g., home automation system 110-*a*) are part of a predetermined group of devices operating in a neighborhood network. Action instruction deriving module 320 may determine that the mobile robotic device 125-*a* may be wirelessly networked with home automation system 110-*a* within a predetermined distance or at a predetermined location. In other examples, the devices may be wirelessly networked with other devices that have opted-into the community networking group.

The action instructions may be communicated from the action instruction deriving module 320 to the action instruction executing module 325. In one example, action instruction executing module 325 may then terminate the lawn mowing operation of the mobile robotic device 125-*a*. In some examples, action instruction executing module 325 may transport the package to a drop-off location. In one example, action instruction executing module 325 may determine the drop-off location for the package based at least on a name on the package, a type of one or more items delivered, a code on the package, tracking information, instructions from the first device, instructions from an occupant of the first location, or a combination thereof.

In one embodiment, action instruction executing module 325, may automatically select and designate a secured area as a drop-off location. In some cases, action instruction executing module 325 may identify a secured area within the first location as the drop-off location. In some other cases, action instruction executing module 325 may identify a secured area outside the first location as the drop-off location. Upon identifying the secured area within the first location as the drop-off location, action instruction executing module 325 may be configured to deactivate at least a portion of a home automation system at the first location. For example, action instruction executing module 325 may transmit a deactivation request to the home automation system 110-a location at the first location. The home automation system 110-a may be configured to deactivate one or more alarms at the boundaries of the first location. Action instruction executing module 325 may then transport the package to the secured area within the first location. In some examples, action instruction executing module 325 in conjunction with the home automation system 110-a at the first location (e.g., premises where the package was delivered), may be configured to reactivate at least the portion of the home automation system at the first location. For example, action instruction executing module 325 may notify the home automation system 110-a upon successful delivery of the package to the first location. Home automation system 110-a at the first location may reactivate the security system at the first location.

In some examples, action instruction executing module 325 may be configured to determine a delivery location within a drop-off location. For example, action instruction executing module 325 may designate an area as the drop-off location and may select a spot within the drop-off location as the delivery spot of the package. In some examples, action instruction executing module 325 may select a delivery area configured by the occupant to be the default delivery area. In some examples, action instruction executing module 325 may be configured to select a drop-off location at a second location different from the premises. Additionally or alternatively, action instruction executing module 325 may store information regarding one or more previous deliveries and analyze the stored information to detect one or more patterns associated with a delivery. Based on the one or more detected patterns, action instruction executing module 325 may select a drop-off location and/or delivery location within the drop-off location.

In some examples, prior to delivering the package to the drop-off location (at the designated delivery location within the drop-off location), action instruction executing module 325 may fly to the first location (premises where the package was delivered). Action instruction executing module 325 may then capture an image of the package. For example, action instruction executing module 325 may utilize a camera associated with the mobile robotic device 125-a to identify a package and capture the image of the package. In some examples, action instruction executing module 325 may compare the captured image with the one or more identifying details associated with the package. In some cases, the identifying details may be retrieved from the package transport request received from home automation system 110-a. In some examples, action instruction executing module 325 may identify the package at the first location based at least in part on the comparing.

In some cases, upon delivering the package to the drop-off location, action instruction executing module 325 may initiate one or more notifications based on the received information regarding a delivery of a package to the drop-off location. In some embodiments, the mobile robotic device 125-a may then return to a designated base or charging station until further action instructions are received. In this way, data received directly at the mobile robotic device 125-a may be utilized to derive new or updated action instructions without interference from the home automation system 110.

Figure 4:
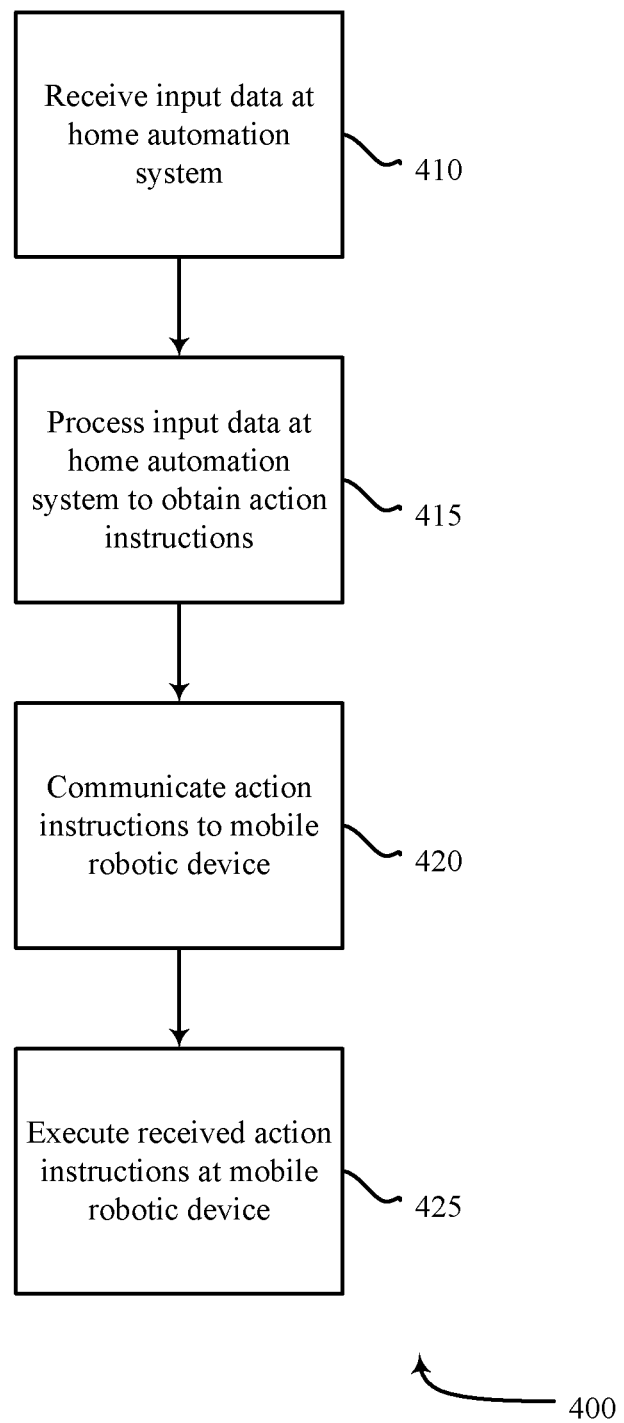
FIG. 4 is a flow diagram illustrating a method for communicating action instructions between a home automation system and a mobile robotic device of FIG. 1 in accordance with various aspects of this disclosure.

FIG. 4 is a flow chart illustrating an example of a method 400 of communicating action instructions between a home automation system and a mobile robotic device, in accordance with various aspects of the present disclosure. For clarity, the method 400 is described below with reference to aspects of one or more of the home automation system 110, one or more sensors 115, network 130, remote computing device 135, and/or mobile robotic device 125 described with reference to FIGS. 1-3. In some examples, remote computing device 135 and/or mobile robotic device 125 may execute one or more sets of codes to control the functional elements of the remote computing device 135 or mobile robotic device 125 to perform the functions described below.

At block 410, method 400 may include receiving input data at the home automation system. As discussed above, input data may be received via one or more sensors, or may be inputted directly at the home automation device by the user. In other embodiments, the user may input data into a remote computing device, which may communicate the inputted data to the home automation device via a server. Inputted data may comprise any data related to home or property security, environment, occupancy, and the like. In alternate embodiments, inputted data may be received at the home automation device from sensors positioned on or integrated with the mobile robotic device via a wired or wireless communication link.

At block 415, method 400 may include processing the inputted data to obtain action instructions. In some embodiments, action instructions may be obtained individually based on discrete inputted data. In other embodiments, as discussed in more detail below with regard to FIG. 5, one or more data patterns may be received at the home automation system, the one or more data patterns comprising user patterns of behavior, from which set action instructions may be derived.

At block 420, method 400 may include communicating the action instructions to the mobile robotic device. As previously discussed with reference to FIG. 1, action instructions may be communicated directly to the mobile robotic device via wired or wireless communication links. Alternatively, action instructions may be communicated to the mobile robotic device via a server and remote computing device.

At block 425, method 400 may include executing the received action instructions at the mobile robotic device. Executing the received action instructions may include performing an intended function of the mobile robotic device, for example, instructing a mobile vacuuming robotic device to perform a vacuuming function. In other embodiments, executing the received action instructions may include instructing the mobile robotic device to perform functions not originally intended for the device. For example, the action instructions may require the mobile vacuuming robotic device to travel through the house or property to locate an individual or object, or may require the vacuuming robotic device to open a door.

In embodiments in which a mobile robotic device is directed to perform functions not originally intended by the manufacturer, various functional attachment members may be coupled to the mobile robotic device. For example, in embodiments in which a mobile vacuuming robotic device is instructed to open a door, the mobile vacuuming robotic device may be retrofitted with a protruding arm member having a magnet at a distal end, wherein the magnet may be activated or deactivated by the home automation system. The magnet positioned at the distal end of the protruding arm coupled to the mobile robotic device may be magnetically coupled to a magnetic strip installed at the base of a door, such that, upon receiving an action instruction, the mobile robotic device may drive to the door, pull the door open using the magnetic force, and may additionally push the door closed. Although described as a magnetic coupling, the protruding arm member may include any other appropriate coupling means, such as a hook feature.

In a further example, a mobile robotic device may be retrofitted with a protruding arm member providing a pushing or turning operability for the mobile robotic device, such that the mobile robotic device may turn off and on dryers, stoves, and the like.

In another example, an existing mobile lawn mowing robotic device may be retrofitted with a moisture or climate sensor, such that the mobile lawn mowing robotic device may be operable to detect rain and may communicate the climate data either to the home automation system or to the action instruction deriving module within the mobile robotic device itself, as discussed with regard to FIG. 3, in order to obtain new or updated action instructions. For example, a mobile lawn mowing robotic device already in operation mowing the lawn may detect via the one or more climate sensors that it has begun to rain, such that new or updated action instructions may direct the mobile lawn mowing robotic device to terminate the lawn mowing operation and return to its charging station.

Figure 5:
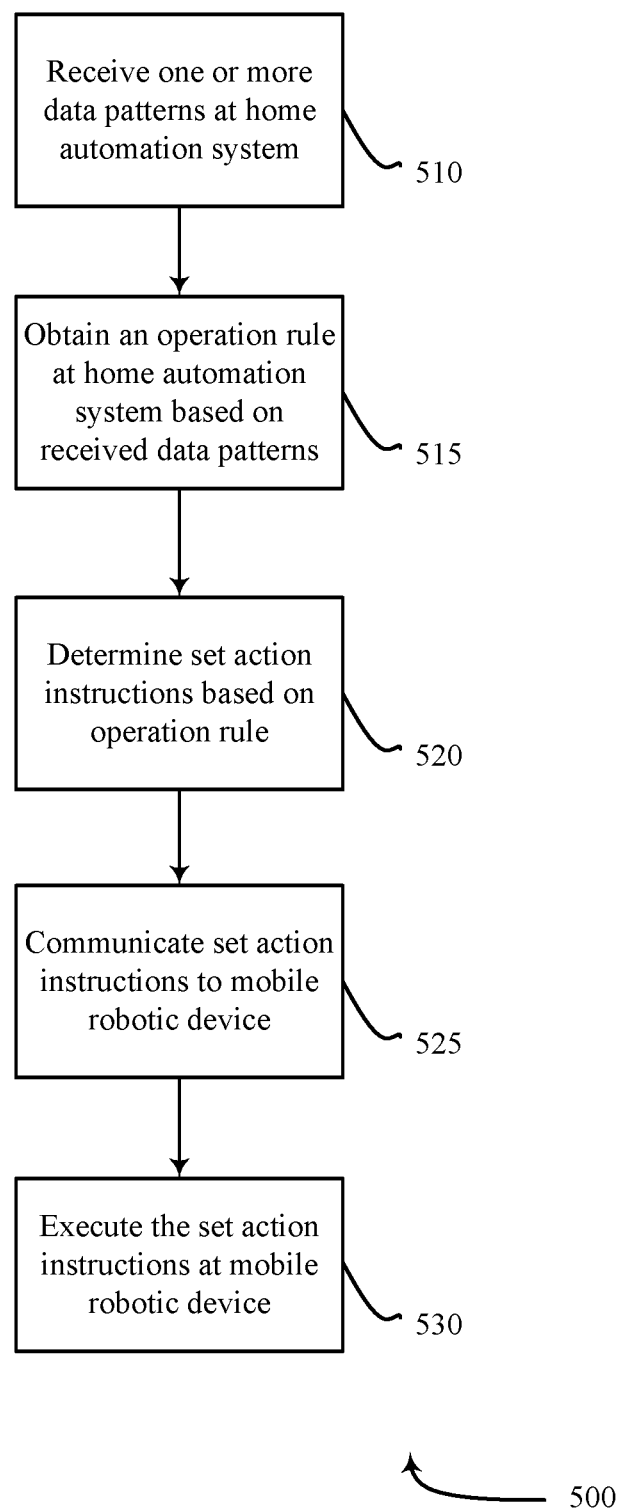
FIG. 5 is a flow diagram illustrating a method for communicating action instructions based on an operation rule between a home automation system and a mobile robotic device of FIG. 1 in accordance with various aspects of this disclosure.

FIG. 5 is a flow chart illustrating an example of a method 500 of communicating action instructions based on an operation rule between a home automation system and a mobile robotic device, in accordance with various aspects of the present disclosure. For clarity, the method 500 is described below with reference to aspects of one or more of the home automation system 110, one or more sensors 115, network 130, remote computing device 135, and/or mobile robotic device 125 described with reference to FIGS. 1-3. In some examples, remote computing device 135 and/or mobile robotic device 125 may execute one or more sets of codes to control the functional elements of the remote computing device or mobile robotic device to perform the functions described below.

At block 510, the method 500 may include receiving one or more data patterns at the home automation device. As previously discussed, the one or more data patterns may comprise user patterns of behavior. For example, one or more sensor unit comprising any one or more of a motion sensor, camera sensor, heartbeat sensor, etc. may communicate data regarding property occupancy patterns to the home automation system. Occupancy data patterns may indicate, for example, that the property is unoccupied every weekday between 10 am and 5 pm.

At block 515, the method 500 may include obtaining an operation rule based on the received data patterns. In the example provided above, the home automation system may receive data patterns relating to property occupancy, and may accordingly obtain an operation rule based on the received data patterns, the occupancy rule indicating that certain mobile robotic device functionalities, for example, vacuuming or deactivating alarm clocks, should only occur when the property is unoccupied.

At block 520, the method 500 may include determining set action instructions based on the operation rule. Thus, the home automation system may determine set action instructions indicating that vacuuming or alarm clock deactivation, for example, should be executed only on Monday-Friday between 10 am and 5 pm.

At block 525, the method 500 may include communicating the operating rule comprising the set action instructions to the mobile robotic device. As previously discussed, the set action instructions may be communicated from the home automation system to the mobile robotic device via wired or wireless communication links directly, or via a network and remote computing device.

At block 530, the method 500 may include executing the set action instructions at the mobile robotic device. Thus, further to the example above, the mobile vacuuming robotic device may initiate a vacuuming operation at 10 am on Monday morning, and a mobile robotic device may deactivate alarm clocks in the home at 10 am on Monday morning.

In some embodiments, action instructions based upon received input data, and/or set action instructions based upon an operation rule, may be updated based on newly received data at either the home automation system or the mobile robotic device. For example, at block 530, after the mobile vacuuming robotic device has initiated a vacuuming operation, the home automation system may receive data via one or more sensors, such as a door sensor, indicating that the home or property is no longer unoccupied. Accordingly, the home automation system may process the input data and obtain new or revised action instructions indicating that the vacuuming operation should terminate, and may communicate the action instructions to the mobile vacuuming robotic device. Upon receipt of the new or updated action instructions, the mobile vacuuming robotic device may execute the action instructions by terminating the vacuuming operation, and may, for example, return to a charging station. Similarly, the mobile vacuuming robotic device, during the course of the vacuuming operation, may detect, for example via a motion sensor positioned on the robotic device, that a user has come home, and may derive updated action instructions indicating that the vacuuming operation should be terminated. The mobile vacuuming robotic device may execute the updated action instructions by terminating the vacuuming operation and may, for example, return to a charging station. In this way, existing mobile robotic devices need not be limited to predetermined functionality schedules, but may instead be updated based on changing property circumstances.

Figure 6:
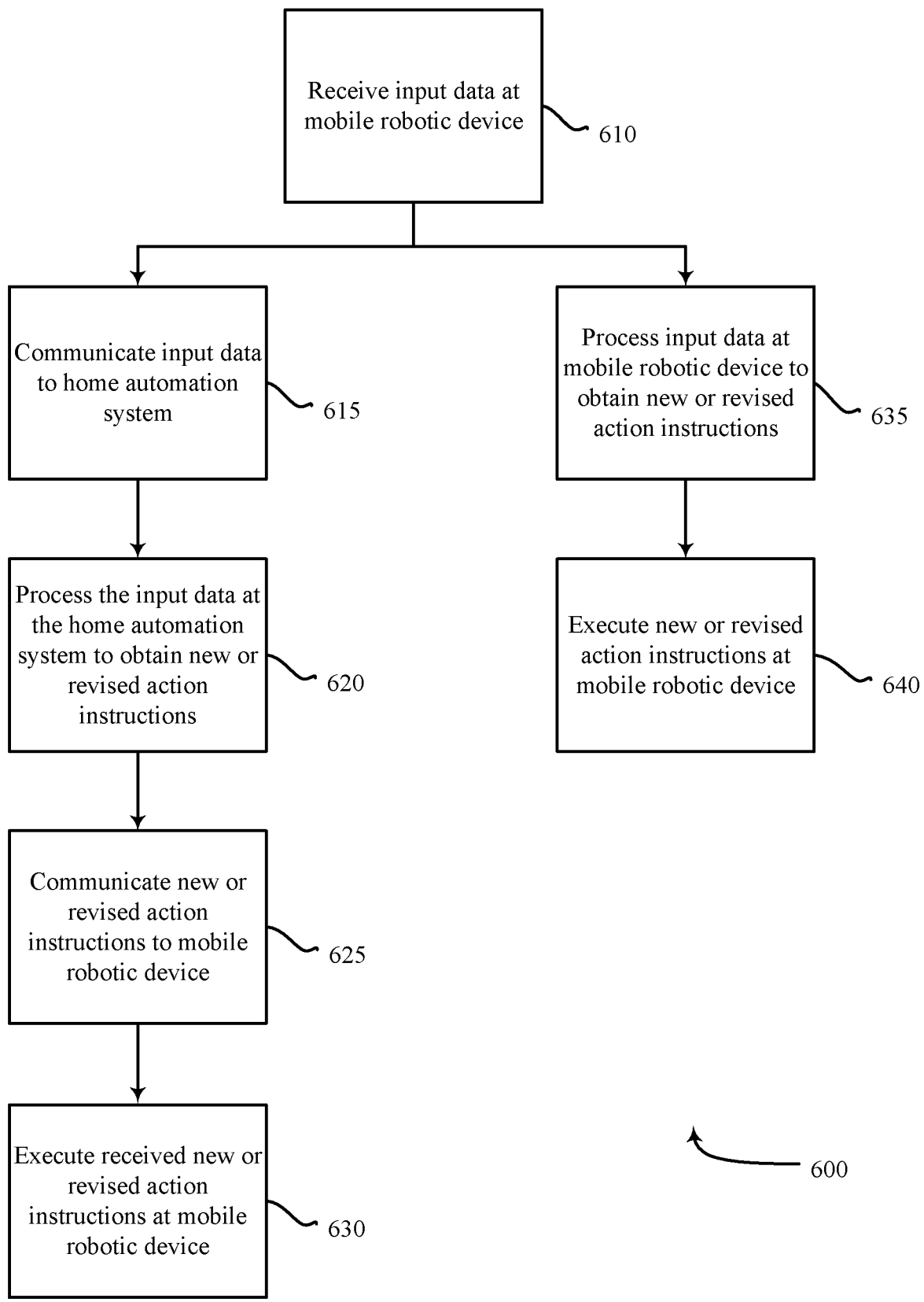
FIG. 6 is a flow diagram illustrating a method for receiving input data at a mobile robotic device of FIG. 1 in accordance with various aspects of this disclosure.

FIG. 6 is a flow chart illustrating an example method 600 of receiving input data at the mobile robotic device, as discussed above. At block 610, the method 600 may include receiving input data at the mobile robotic device. For example, one or more sensors positioned on or integrated with the mobile robotic device may detect a plurality of home security, environment, occupancy or other relevant property data. The input data received at the mobile robotic device may be collected on an ongoing basis, at intervals, or in some embodiments may be collected at the direction of the home automation system.

At block 615, the method 600 may include communicating the inputted data to the home automation system. As previously discussed, the inputted data may be communicated to the home automation system via a wired or wireless communication link, or alternatively may be communicated to the home automation system via a remote computing system and server.

At block 620, the method 600 may include processing the inputted data at the home automation system to obtain new or revised action instructions. For example, as discussed in a previous example, a mobile lawn mowing robotic device may detect, via one or more sensors, that it has begun to rain. The collected climate data may be communicated to the home automation system, which may obtain new or revised action instructions indicating that the mobile lawn mowing robotic device should terminate the lawn mowing operations.

At block 625, the method 600 may include communicating the new or revised action instructions to the mobile robotic device, and at block 630, the mobile robotic device may execute the new or revised action instructions. In the present example, the mobile robotic device may receive the new or revised action instructions from the home automation system and may terminate the lawn mowing operation and may, in some embodiments, return to a base or charging station.

Alternatively or in addition to the above described embodiment, after the input data is received at the mobile robotic device at block 610, the inputted data may be processed locally at the mobile robotic device at block 635 in order to obtain new or revised action instructions. At block 640, the method 600 may then include executing the new or revised action instructions at the mobile robotic device.

In an alternative embodiment, input data may be received at the remote computing device (as illustrated in FIG. 1). For example, a user may indicate that he has returned home via a manual or sensor-based (for example GPS) input into a dedicated application on his smart phone or other remote computing device. In another embodiment, weather forecasting data received at the remote computing device via the dedicated application may indicate that rain is forecasted in the coming hour. This user- or application-inputted data may be communicated from the remote computing device to the home automation system and/or the mobile robotic device such that new or revised action instructions may be obtained, and may be executed by the mobile robotic device.

Figure 7:
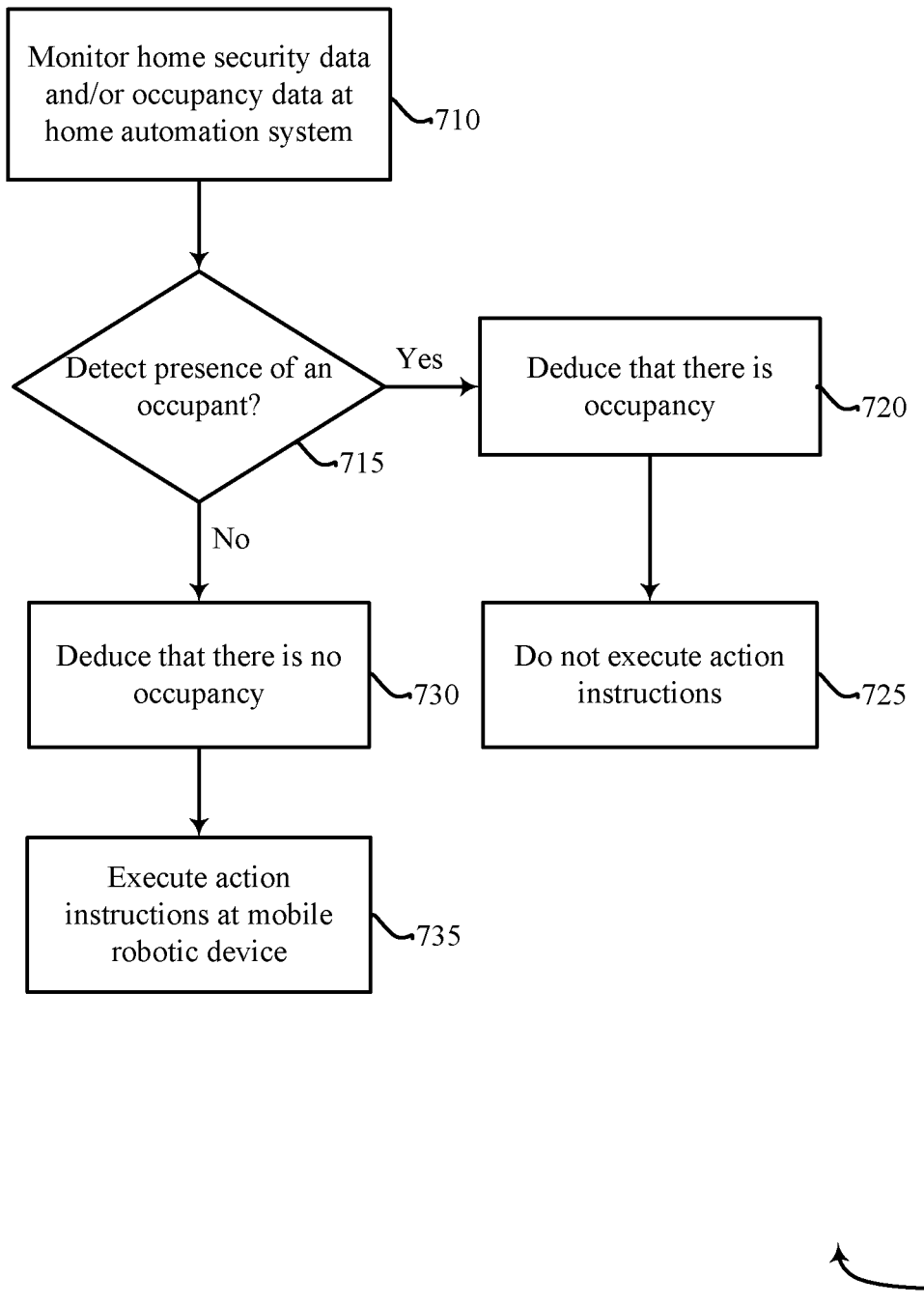
FIG. 7 is a flow diagram illustrating a method of monitoring home security data in determining whether to perform action instructions using a home automation system and mobile robotic device of FIG. 1 in accordance with various aspects of this disclosure.

FIG. 7 is a flow chart illustrating an example of a method 700 of receiving home occupancy data and executing derived operating instructions accordingly. For clarity, the method 700 is described below with reference to aspects of one or more of the home automation system 110, one or more sensors 115, network 130, remote computing device 135, and/or mobile robotic device 125 described with reference to FIGS. 1-3. In some examples, remote computing device 135 and/or mobile robotic device 125 may execute one or more sets of codes to control the functional elements of the remote computing device or mobile robotic device to perform the functions described below.

At block 710, the method 700 may include monitoring home security data, occupancy data, or other property-related data at the home automation system. As previously described, this monitoring may comprise monitoring threshold sensors, utilizing motion sensors, or collecting video recording data. Home security data and/or occupancy data may be monitored and collected by one or more sensor units, or alternatively may be inputted by a home owner at the remote computing device. In some embodiments, home security data and/or occupancy data may be collected by the mobile robotic device.

At block 715, the method 700 may include determining whether the presence of an occupant is detected in the home. Again, this occupancy may be determined by any number or combination of sensor units, including motion detectors, video monitors, and threshold sensors. If, at block 715, it is determined that there is occupancy in the house at block 720, then at block 725 no action instructions will be executed. For example, action instructions may include instructions to vacuum the house, but may be limited only to times during which the home or property is unoccupied. The determination that there is occupancy and therefore that action instructions should not be executed may be performed at the home automation system, at the mobile robotic device, or at a combination of the two. For example, in one embodiment, the mobile robotic device may collect the data indicating that the home is occupied, and may transmit this data to the home automation system, where the home automation system will determine, based on a predetermined rule, that no action instructions should be transmitted and/or executed at this time.

If, in the alternative, at block 715 no occupant presence is detected, at block 730 of the method 700, it may be deduced that there is no occupancy on the property, and accordingly at block 735, the action instructions may be executed at the mobile robotic device. Again, the action instructions may be dependent upon a predetermined, user-selected rule indicating that, for example, the home should only be vacuumed when unoccupied. Thus, when data is collected, at either one or more of the sensor units or at the mobile robotic device itself, indicating that the home is unoccupied, action instructions that a vacuum function should be performed may be derived at either the home automation system or the mobile robotic device, and the mobile robotic device may execute the vacuuming action instructions accordingly.

In other embodiments, the data monitored at block 710 may include, for example, climate data to determine whether it is raining, such that action instructions may be derived for a mobile robotic device having lawn mowing functionality to execute lawn mowing action instructions accordingly.

Figure 8:
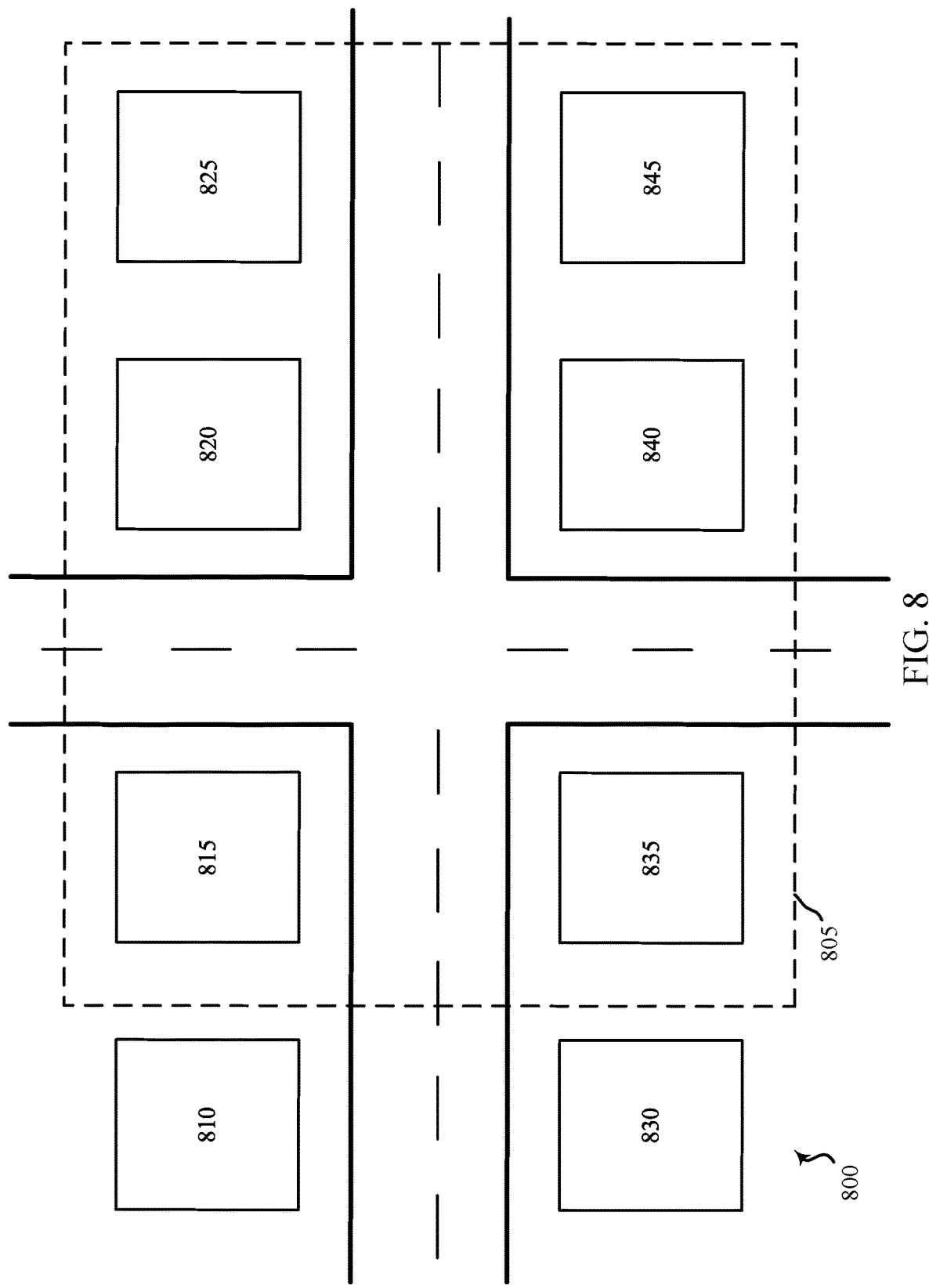
FIG. 8 shows a block diagram relating to a mobile robotic device communication system, in accordance with various aspects of this disclosure.

FIG. 8 show block diagram relating to a security and/or an automation system, in accordance with various aspects of this disclosure. In particular, FIG. 8 shows an example residential neighborhood 800 having eight houses 810, 815, 820, 825, 830, 835, 840 and 845. Although FIG. 8 shows an example residential neighborhood with houses located within a geographic area of one another, it should be understood that neighborhood 800 may be a residential area, a commercial area, a rural area, and/or a mixed use area, among other examples. In addition, the houses 810-845 may be any type of structures, and the structures need not be located next to one another, but rather may be located in different geographic locations separated by any contemplated distance (e.g., same sub-division, same commercial block, same multi-unit building, different sub-divisions, different commercial blocks, located on the same street but separated by one or miles). The systems and methods described herein relate to the example residential neighborhood 800, but the system and methods are not limited to neighborhood 800.

In neighborhood 800, any of the eight houses 810-845 may be coupled to at least one audio/video device, such as a mobile robotic device (such as a drone), a security and/or doorbell camera in wireless communication with at least one audio/video device located at another house; however, not all the devices may be in wireless communication with each other. Dotted line 805 shows a grouping of houses which are wirelessly networked to communicate with at least one other house located within the dotted line 805 by way of at least one audio/video device located at and/or associated with houses 815, 820, 825, 830, 835, 840, and/or 845. In this example, the six houses that are in networked wireless communication with each other are shown to be next to one another, however, the networked houses need not be next to each other. For example, houses 815, 820, 840, and 845 may be wirelessly networked in another example. In another example, any or some of the houses shown in within dotted line 805 may also be in wireless communication with a house (e.g., based on a device associated with and/or located at a house communicating with a device associated with a second house) that is not shown in FIG. 8.

Thus, in one example, the devices and/or houses may be part of a network based on proximity within a location; however, in other examples, the devices may be part of a network based on a specific association. For example, a community network may include a neighborhood-based social network, a social group network, an opt-in network that is not proximity based, an opt-in network that is proximity based, an automatically established network link based on location and proximity (e.g., portable electronic device running an application enters a building enabled to perform the methods described herein). For example, houses 815, 820, 825, 835, 840, and 845 may all be part of a homeowners' association, where houses 810 and 830 are not part of the same homeowners' association, even though houses 810 and 830 are located in the same neighborhood. In some examples, the devices and/or houses may be members of a group (e.g., a street watch group). In some examples, the devices and/or houses may each be related to one or more street watch groups. The devices and/or houses may be capable of choosing members of their personal street watch group based on user input, location of potential users, geographic proximity of one or more objects to one or more objects or locations, other information, or some combination.

Each of the devices associated with the location of each of the houses may share any or all of the same capabilities as each other device. For example, a device associated with house 815 may be enabled to obtain data from a first sensor at house 815. In one example, the sensor may be part of the mobile robotic device. In some examples, mobile robotic device may be associated with one or more of houses 815, 820, 825, 830, 835, 840, and/or 845. In another example, the sensor may be physically integrated as part of the device and/or may be in wired and/or wireless communication with the device. The data obtained by the sensor may include: biometric and personal data such as fingerprints, retinal scans, facial scans, gait, height, weight, speed, cadence, hair color, hair length, presence of facial hair, tattoos, piercings, jewelry, clothing style, clothing color, voice recordings, personal identification numbers, radio frequency data related to a RFID tag associated with a person, identification of an electronic device such as a smartphone, table, or wearable electronic device, and the like.

The sensor may also obtain data related to animals, vehicles, environment, and non-tangible items, such car types, delivery vehicles, company logos, identification card data, rain, wind, sounds related to walking, running, talking, screaming, laughing, wind, glass breaking, doors opening and closing, sirens, alarms, etc. which are determined to be within a predetermined proximity of example house 815. In some examples, the sensor may obtain data related to package delivery, identification of delivery person, identification of delivery vehicle, etc.

In addition, a mobile robotic device may receive information regarding a delivery of a package to a first location from a first device. For example, the mobile robotic device may be associated with house 810 and the first device may be a control panel at a second house 845. The mobile robotic device (e.g., a drone) may determine that a mobile robotic device and the first device are part of a predetermined group of devices operating in a network (e.g., a neighborhood network). In one example, the mobile robotic device associated with house 810 may receive a request regarding delivery of a package at or near house 845 (for example from a smartphone of an occupant of house 845 or control panel of house 845). In order to reach house 845, the mobile robotic device may fly past houses 815, 835, 820, 840 and 825. The mobile robotic device may be configured to follow the dotted line as route from house 810 to house 845. Upon reaching house 845, the mobile robotic device may identify the package at or near house 845. The mobile robotic device may transport the package to a drop-off location. In one example, the mobile robotic device may determine that the drop-off location is at house 820 (neighbor's house). The mobile robotic device may be configured to determine the shortest route from house 845 to house 820. In some examples, the shortest route from house 845 to house 820 may include a street between house 825 and house 820. In such an example, the mobile robotic device may be configured to follow the street between house 845 to house 820, among other examples.

Figure 9:
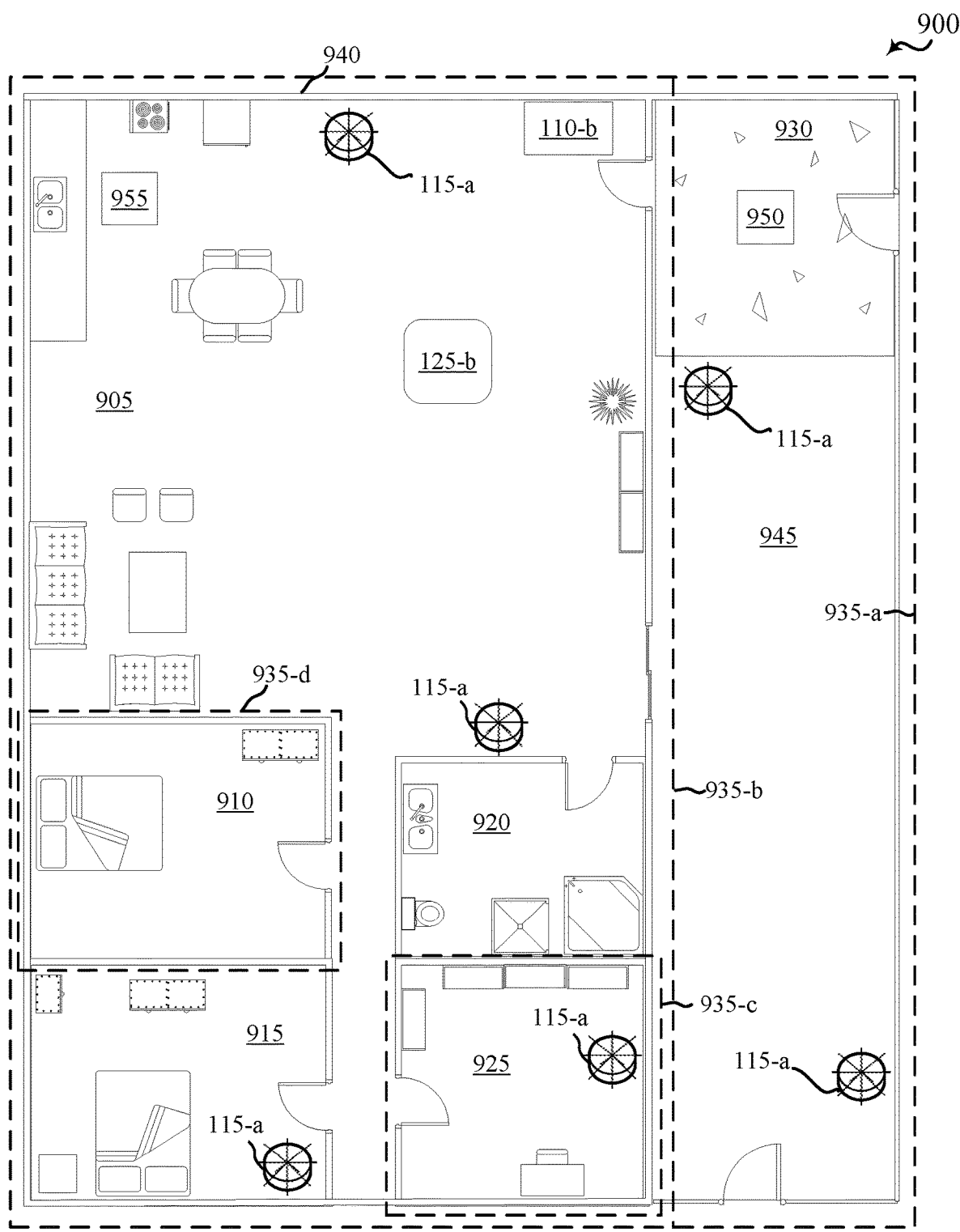
FIG. 9 is a schematic diagram of one example of a home with a home automation system and a mobile robotic device in accordance with various aspects of this disclosure.

FIG. 9 is a schematic diagram of one example of a home 900 with a home automation system 110-b and a mobile robotic device 125-b in accordance with various embodiments. The mobile robotic device 125-b may be an example of one or more aspects of the mobile robotic device 125-b of FIG. 1. The home automation system 110-b may be an example of one or more aspects of the home automation system 110 of FIG. 1. The home 900 may include the mobile robotic device communication system 100 described with reference to FIG. 1.

The home 900 includes a building 940 and a yard 945. The building 940 includes rooms 905, 910, 915, 920, and 925 and the yard 945 includes a porch 930. Several sensor units 115-a are distributed about the home 900 and are in communication with the home automation system 110-b. The sensor units 115-a may be an example of one or more aspects of the sensor units 115 of FIG. 1. The size, location, number, and design of the home 900 is merely illustrative. Furthermore, the home may be any other type of building or property. Other examples may include more or less rooms and sensor units 115-a, additional home automation system 110-b that may be integrated with a different part of the property, and two or more mobile robotic devices 125-b.

In the example of FIG. 1, the home 900 has four boundaries 935-a, 935-b, 935-c, and 935-d. The boundary 935-a is a virtual boundary around the property of the home 900. In this example, the home automation system 110 monitors and controls various functionalities of the home within the boundary 935-a. In some cases, within the boundary 935-a, the home automation system 110 may have different levels of control. For example, the boundary 935-a includes the building 940 but does not include the yard 945. In one example, the home automation system 110 may restrict access to the building 940 while not restricting access to the yard 945. One example of the home automation system 110 restricting access is to maintain the doors and windows to the building 940 in a locked state. The home automation system 110 may unlock a portion of the building 940 to allow the mobile robotic device 125-*b* to bring in a package into the building 940.

The boundaries 935-*c* and 935-*d* are illustrated as boundaries internal to the building 940. For example, the boundary 935-*c* includes an office room 925 and the boundary 935-*d* includes a bedroom 910. The home automation system 110 may be able to control and/or initial control of access to either of the rooms 910 and 925. In this particular example, the home automation system 110 has no sensor units 115-*a* in the bedroom 910 but does have at least one sensor unit 115-*a* in the office 925. In other examples, other rooms and sensor units 115-*a* may be used.

An object 950 may be delivered on the porch 930, outside of the boundary 935-*b*. The package 950 may be, for example, a package dropped off by a delivery service or a neighbor or friend. One or more of the home automation system 110, or the mobile robotic device 125-*b*, may detect that the package 950. Once the package 950 has been detected, the mobile robotic device 125-*b*, may retrieve the package 950. In some cases, mobile robotic device 125-*b* may be associated with the home automation system 110 (belong to the same home 900). In some examples, mobile robotic device 125-*b* may fly to retrieve the package 950 from a second location. Upon receiving indication from the mobile robotic device 125-*b*, the home automation system 110 may deactivate a portion of itself to allow the mobile robotic device 125-*b* to enter the home 900. The deactivation may include, for example, unlocking a door or turning off an alarm for the door. In some examples, the home automation system 110 monitors the location and progress of the mobile robotic device 125-*b* in order to know when to reactivate at least the portion of the home automation system 110. In other examples, the home automation system 110 deactivates and reactivates the portion at least partially based on requests from the mobile robotic device 125-*b*. In other examples, the home automation system 110 deactivates and reactivates the portion at least partially based on requests from an authorized user.

The mobile robotic device 125-*b* may approach the package 950 and inspect it. The mobile robotic device 125-*b* may determine a name associated with the package 950 (e.g., a name to which the package is addressed), a source of the package 950, tracking information for the package 950, a type of package 950, and a drop-off location for the package 950. The mobile robotic device 125-*b* may also inspect the package 950 for safety (e.g., ensuring that the object 950 is safe to bring inside the building 940 and is not, for example, a bomb or other dangerous material). If the package 950 is determined appropriate to bring inside the building 940, the mobile robotic device 125-*b* may pick up the package 950 and transport it inside the building 940, traveling across the boundary 935-*b*. Once inside, the home automation system 110 may reactivate the portion that was deactivated, which may include locking the door or window used by the mobile robotic device 125-*b* or activating the alarm system. The home automation system 110 may provide a notification to the mobile robotic device 125-*b* or a user that the deactivated portion of the home automation system 110 has been reactivated.

The mobile robotic device 125-*b* may determine a drop-off location for the package 950. In one example, the drop-off location may be the room 910. The mobile robotic device 125-*b* may transport the package 950 to the room 910 and drop or set the package 950 down within the room 910.

Figure 10:
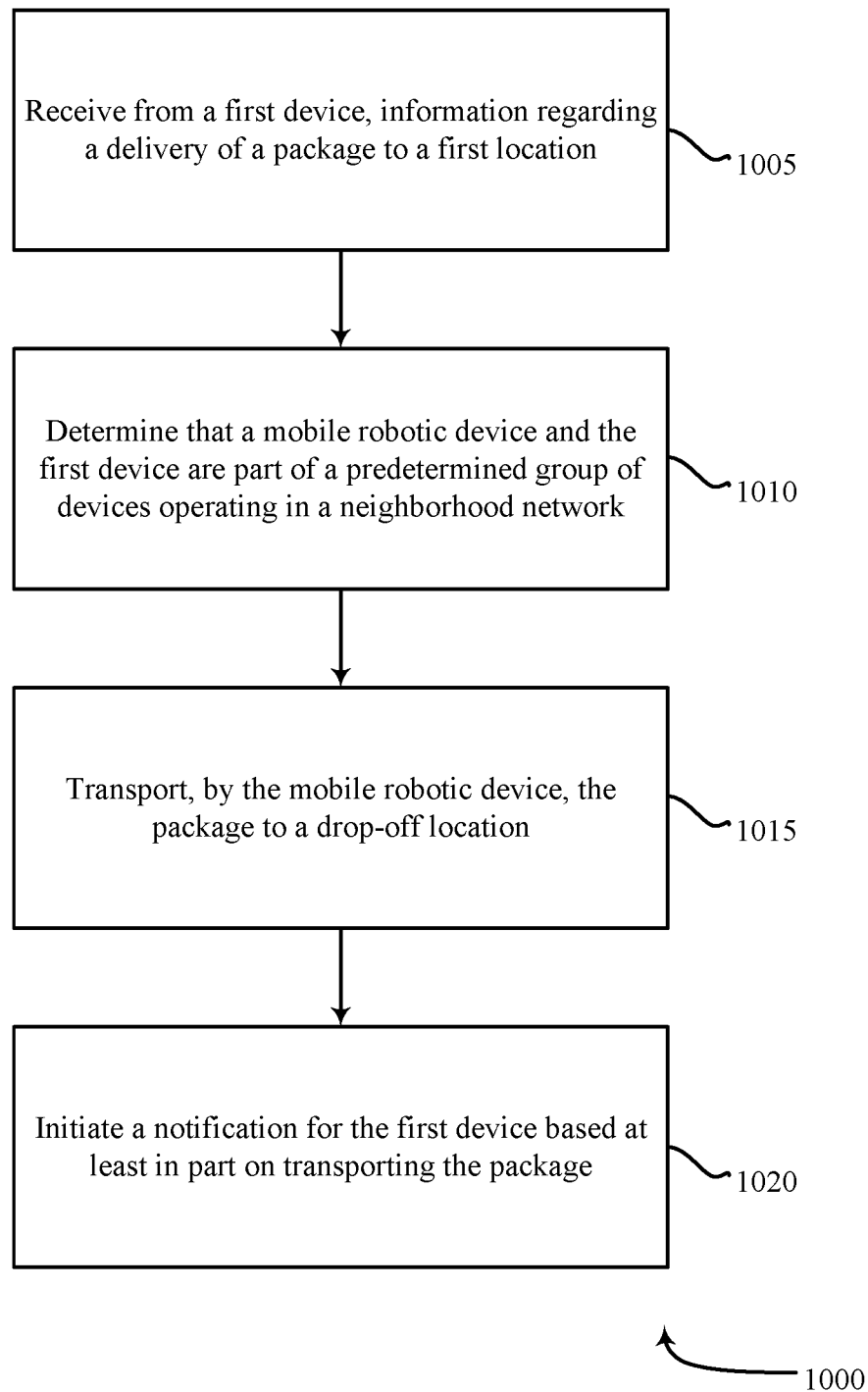
FIG. 10 is a flow diagram illustrating a method relating to a mobile robotic device communication system, in accordance with various aspects of this disclosure.

FIG. 10 is a flow chart illustrating an example of a method 1000 of communicating action instructions based on an operation rule between a home automation system and a mobile robotic device, in accordance with various aspects of the present disclosure. For clarity, the method 1000 is described below with reference to aspects of one or more of the home automation system 110, one or more sensors 115, network 130, remote computing device 135, and/or mobile robotic device 125 described with reference to FIGS. 1-3. In some examples, remote computing device 135 and/or mobile robotic device 125 may execute one or more sets of codes to control the functional elements of the remote computing device or mobile robotic device to perform the functions described below.

At block 1005, the method 1000 may include receiving from a first device, information regarding a delivery of a package to a first location. As previously discussed, the first device may be a stationary device (such as home automation system or a control panel) and the information may be received by a mobile robotic device (such as a drone). In some cases, the received information may comprise of a height of the package, a length of the package, a width of the package, an estimated weight of the package, a volume of the package, an identification of the package, an image of the package, information associated with a current location of the package, or a combination thereof.

At block 1010, the method 1000 may include determining that a mobile robotic device and the first device are part of a predetermined group of devices operating in a neighborhood network. For example, the mobile robotic device may determine that the mobile robotic device and the first device belong to same neighborhood watch group.

At block 1015, the method 1000 may include transporting, by the mobile robotic device, the package to a drop-off location. Prior to transmitting, the mobile robotic device may determine the drop-off location for the package based at least on a name on the package, a type of one or more items delivered, a code on the package, tracking information, instructions from the first device, instructions from an occupant of the first location, or a combination thereof.

At block 1020, the method 1000 may include initiating a notification for the first device based at least in part on transporting the package.

Figure 11:
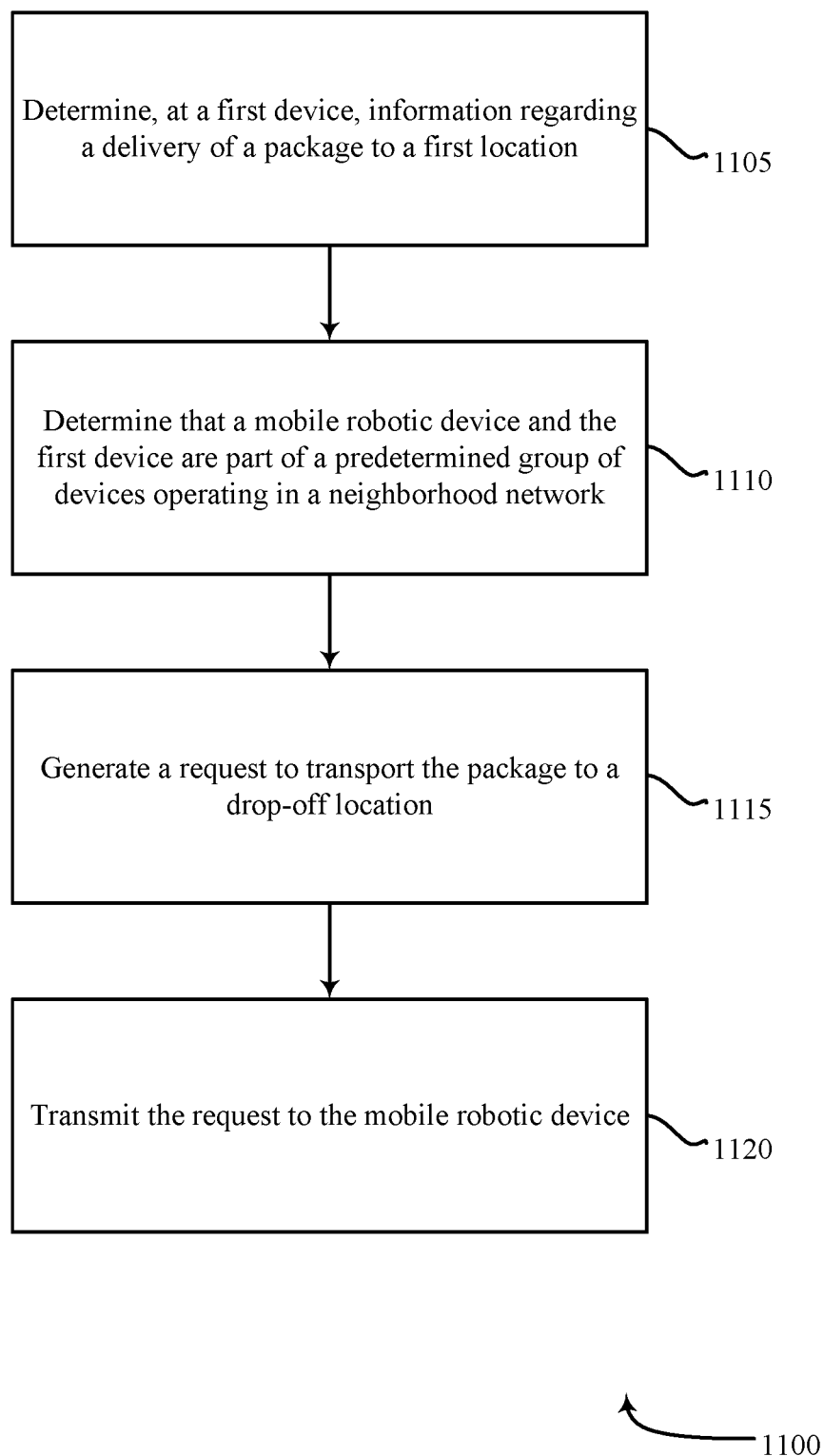
FIG. 11 is a flow diagram illustrating a method relating to a mobile robotic device communication system, in accordance with various aspects of this disclosure.

FIG. 11 is a flow chart illustrating an example of a method 1100 of communicating action instructions based on an operation rule between a home automation system and a mobile robotic device, in accordance with various aspects of the present disclosure. For clarity, the method 1100 is described below with reference to aspects of one or more of the home automation system 110, one or more sensors 115, network 130, remote computing device 135, and/or mobile robotic device 125 described with reference to FIGS. 1-3. In some examples, remote computing device 135 and/or mobile robotic device 125 may execute one or more sets of codes to control the functional elements of the remote computing device or mobile robotic device to perform the functions described below.

At block 1105, the method 1100 may include determining, at a first device, information regarding a delivery of a package to a first location. As previously discussed, the first device may be a stationary device (such as home automation system or a control panel). In some examples, determining information regarding delivery of a package may include detecting a person having the package at the first location and detecting the package being delivered at the first location.

At block 1110, the method 1100 may include determining that a mobile robotic device and the first device are part of a predetermined group of devices operating in a neighborhood network. In some examples, the first device may be a home automation system associated with a first location and the mobile robotic device may be a drone associated with a second location. The mobile robotic device and the first device may belong to same neighborhood watch group.

At block 1115, the method 1100 may include generating a request to transport the package to a drop-off location. For example, the first device (e.g., home automation system) may generate a request for the mobile robotic device to transport the package to a secure drop-off location. In some cases, the drop-off location may be determined by the first device. In some cases, the drop-off location may be predetermined by an occupant at the first location.

At block 1120, the method 1100 may include transmitting the request to the mobile robotic device.

Figure 12:
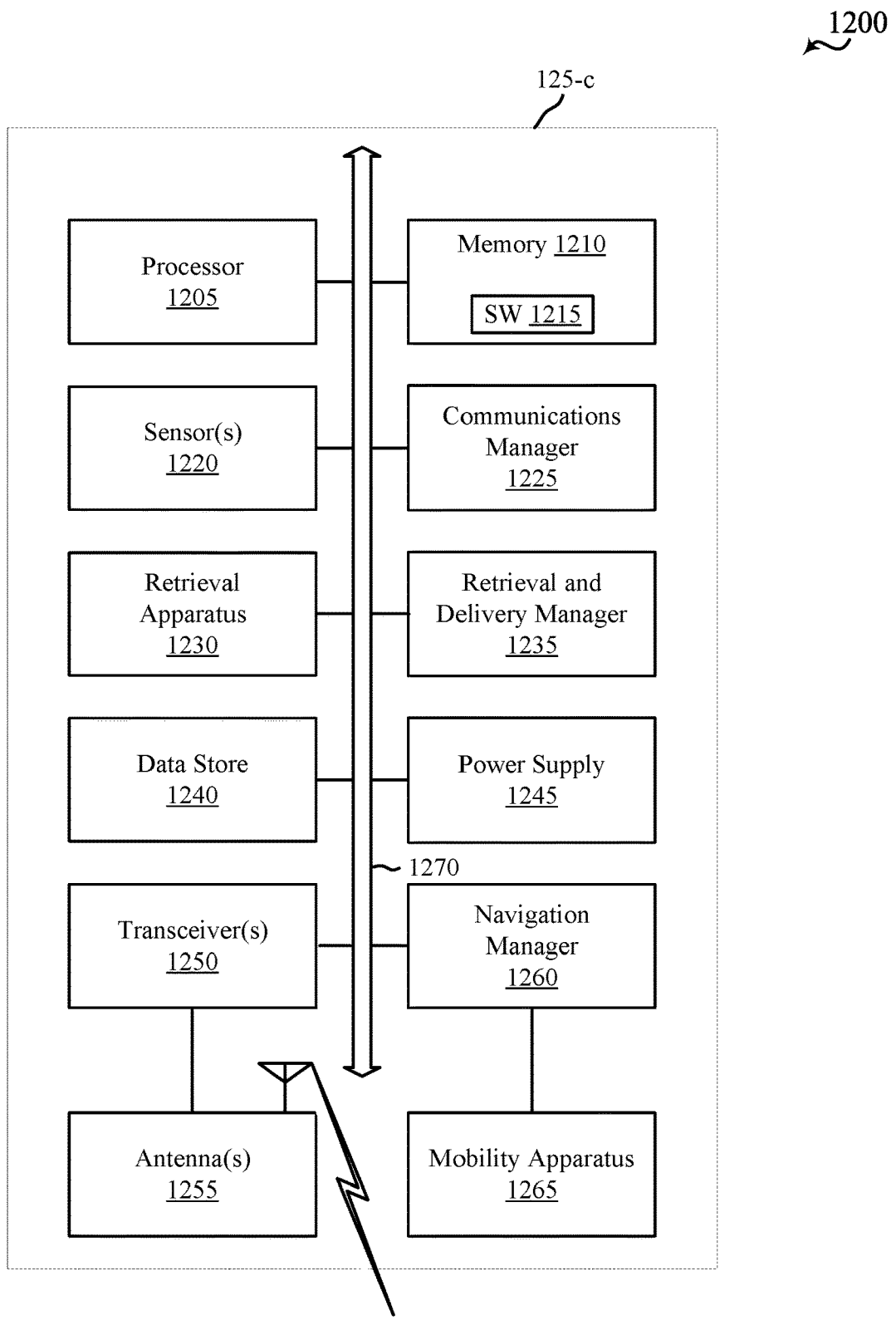
FIG. 12 is a block diagram of one example mobile robotic device in accordance with various embodiments.

FIG. 12 is a block diagram 1200 of an example of a mobile robotic device 125-c in accordance with various embodiments. The mobile robotic device 125-c may be an example of one or more aspects of the mobile robotic device 125 of FIGS. 1 and 3. The mobile robotic device 125-c may be configured to retrieve an object and transport it across a boundary of a home automation system 110. The mobile robotic device 125-c may be an autonomous device that can move about on its own.

The mobile robotic device 125-c may have an internal power supply 1245, such as a rechargeable battery, to facilitate mobile operation. The mobile robotic device 125-c may include a processor 1205, a memory 1210, a one or more transceivers 1250, one or more antennas 1255, one or more sensors 1220, and a data store 1240. The mobile robotic device 125-c may also include a retrieval apparatus 1230 and a retrieval and delivery manager 1235. The mobile robotic device 125-c may also include a mobility apparatus 1265 and a navigation manager 1260. Each of these components may be in communication with each other, directly or indirectly, over at least one bus 1270. The mobile robotic device 125-c may have various other configurations in other examples.

The memory 1210 may include RAM and ROM. The memory 1210 may store computer-readable, computer-executable software code 1215 containing instructions that are configured to, when executed, cause the processor 1205 to perform various functions described herein for secure transportation of objects. The memory 1210 may also store information about expected deliveries, object recognition information, information about the home automation system 110, information about users of the home automation system 110, and the like. Alternatively, the software code 1215 may not be directly executable by the processor 1205 but be configured to cause the processor 1205 (e.g., when compiled and executed) to perform functions described herein.

The processor 1205 may include an intelligent hardware device, e.g., a CPU, a microcontroller, an ASIC, etc. The processor 1205 may process information received through the one or more sensors 1220 or transceivers 1250 and/or to be sent to the one or more transceivers 1250 for transmission through the antennas 1255. The processor 1205 may handle, alone or in connection with the retrieval and delivery manager 1235 or the navigation manager 1260, various aspects for secure transportation of objects.

The one or more transceivers 1250 may be configured to communicate bi-directionally with the home automation system 110 described in FIGS. 1-2 or the remote computing device 135 or the network 130 as described in FIG. 1. The one or more transceivers 1250 may be implemented as at least one transmitter and at least one separate receiver. The one or more transceivers 1250 may include a modem configured to modulate packets and provide the modulated packets to the antennas 1255 for transmission, and to demodulate packets received from the antennas 1255. While the mobile robotic device 125-c may include a single antenna, there may be aspects in which the mobile robotic device 125-c may include multiple antennas 1255. The mobile robotic device 125-c may also include one or more radio access technologies, including Wi-Fi, radio frequency, infrared, or cellular technologies.

According to the architecture of FIG. 12, the mobile robotic device 125-c may further include a communications manager 1225. The communications manager 1225 may manage communications with various access points. The communications manager 1225 may be a component of the mobile robotic device 125-c in communication with some or all of the other components of the mobile robotic device 125-c over the at least one bus 1270. Alternatively, functionality of the communications manager 1225 may be implemented as a component of the one or more transceivers 1250, as a computer program product, and/or as at least one controller element of the processor 1205.

Examples of the sensors 1220 may include any one or more of a camera sensor, audio sensor, shock sensor, proximity sensor, boundary sensor, temperature sensor, light beam sensor, 3-D sensor, motion sensor, smoke sensor, carbon monoxide sensor, accelerometer, gyroscope, GNSS or GPS sensor, Wi-Fi positioning system sensor, capacitance sensor, chemoreceptor, odor sensor, infrared sensor, radio frequency sensor, near-field sensor, pressure sensor, seismic sensor, radar sensor, LIDAR sensor, heartbeat sensor, breathing sensor, oxygen sensor, carbon dioxide sensor, brain wave sensor, voice sensor, and the like.

The mobility apparatus 1265 may be any apparatus that enables the mobile robotic device 125-c to move. Examples of the mobility apparatus 1265 may include one or more wheels, legs, feet, tracks, wings, airfoils, blades, rudders, elevators, propellers, rotors, or any other device that may be used to move the mobile robotic device 125-c. The mobility apparatus 1265 may also include some of the machinery that is used to propel the mobile robotic device 125-c, such as a motor and related structure. The navigation manager 1260 may operate and instruct the mobility apparatus 1265. The navigation manager 1260 may also aid in positioning, navigation, orientation, and balance for the mobile robotic device 125-c.

The retrieval apparatus 1230 may be any apparatus that enables the mobile robotic device 125-c to retrieve and drop off an object. Examples of the retrieval apparatus 1230 may include one or more arms, hands, claws, feet, grasping device, magnets, electromotive force generator, suction cups, vacuum devices, or the like. In some examples, the retrieval apparatus 1230 may be a part on the mobile robotic device 125-c where someone or another robotic device can place an object. The retrieval and delivery manager 1235 may operate and instruct the retrieval apparatus 1230. The retrieval and delivery manager 1235 may instruct the retrieval apparatus 1230 to pick up an object, carry the object, and drop the object off at a desired location.

The components of the mobile robotic device 125-c may be configured to implement aspects discussed above with respect to FIGS. 1-2, and those aspects may not be repeated here for the sake of brevity. Moreover, the components of the mobile robotic device 125-c may be configured to implement aspects discussed with respect to FIGS. 2-11, and those aspects may not be repeated here also for the sake of brevity.

Figure 13:
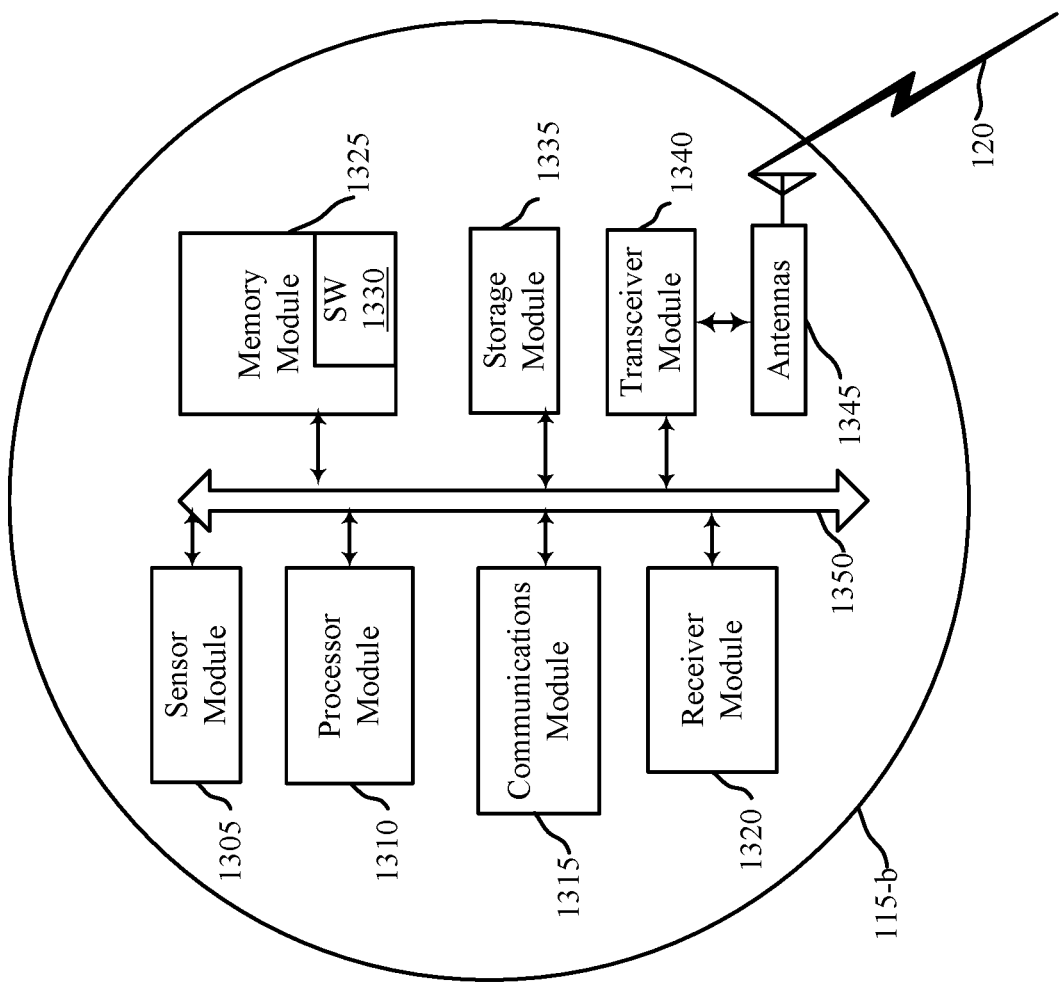
FIG. 13 is a block diagram of an example of a sensing apparatus for receiving home security and climate data in accordance with various embodiments.

FIG. 13 shows a block diagram 1300 of a sensor unit 115-b for use in collecting home security, occupancy, and other property-related data, in accordance with various aspects of the present disclosure. The sensor unit 115-*b* may have various configurations. The sensor unit 115-*b* may, in some examples, have an internal power supply (not shown), such as a small battery, to facilitate mobile operation. In some examples, the sensor unit 115-*b* may be an example of one or more aspects of one of the sensor units 115 described with reference to FIG. 1. The sensor unit 115-*b* may be configured to implement at least some of the features and functions described with reference to FIG. 1.

The sensor unit 115-*b*, which may include one or more aspects of sensor unit 115 (as described in FIG. 1), may include a sensor module 1305, a processor module 1310, a memory module 1325, a communications module 1315, at least one transceiver module 1340, at least one antenna (represented by antennas 1345), a storage module 1335, and/or a receiver module 1320. Each of these components may be in communication with each other, directly or indirectly, over one or more buses 1350.

The memory module 1325 may include RAM or ROM. The memory module 1325 may store computer-readable, computer-executable software code 1330 containing instructions that are configured to, when executed, cause the processor module 1310 to perform various functions described herein for communicating, for example, home occupancy data. Alternatively, the software code 1330 may not be directly executable by the processor module 1310, but may be configured to cause the sensor unit 115-*b* (e.g., when compiled and executed) to perform various of the functions described herein.

The processor module 1310 may include an intelligent hardware device, e.g., a CPU, a microcontroller, an ASIC, etc. The processor module 1310 may process information received through the transceiver module 1340 or information to be sent to the transceiver module 1340 for transmission through the antenna 1345. The processor module 1310 may handle, alone or in connection with the receiver module 1320, various aspects of signal processing as well as determining and transmitting home security and environment data.

The transceiver module 1340 may include a modem configured to modulate packets and provide the modulated packets to the antennas 1345 for transmission, and to demodulate packets received from the antennas 1345. The transceiver module 1340 may, in some examples, be implemented as one or more transmitter modules and one or more separate receiver modules. The transceiver module 1340 may support smart home data-related communications. The transceiver module 1340 may be configured to communicate bi-directionally, via the antennas 1345 and communication link 120, with, for example, mobile robotic device 125 and remote computing device 135 (via network 130 of FIG. 1). Communications through the transceiver module 1340 may be coordinated, at least in part, by the communications module 1315. While the sensor unit 115-*b* may include a single antenna, there may be embodiments in which the sensor unit 115-*b* may include multiple antennas 1345.

Regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiments are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for security or automation systems, comprising:
   receiving, from a first device, information regarding a delivery of a package to a first location;
   determining that a mobile robotic device and the first device are part of a predetermined group of devices operating in a neighborhood network based at least in part on receiving the information regarding the delivery of the package;
   determining that the mobile robotic device is wirelessly networked with the first device when the mobile robotic device is within a predetermined distance of the first device or that the mobile robotic device is at a predetermined location based at least in part on determining that the mobile robotic device and the first device are operating in the neighborhood network;
   transporting, by the mobile robotic device, the package to a drop-off location based at least in part on determining that the mobile robotic device is wirelessly networked with the first device when the mobile robotic device is within the predetermined distance of the first device or that the mobile robotic device is at the predetermined location; and
   initiating a notification for the first device based at least in part on transporting the package.

2. The method of claim 1, wherein the first device comprises a stationary device associated with a home automation system at the first location and the mobile robotic device comprises an unmanned air vehicle.

3. The method of claim 1, further comprising:
   receiving, from the first device, a request to transport the package to the drop-off location, wherein transporting the package is based at least in part on receiving the request.

4. The method of claim 3, further comprising:
   receiving data related to occupancy at the first location; and
   determining to transport the package to the drop-off location based at least in part on the received data, wherein transporting the package is based at least in part on determining to transport the package.

5. The method of claim 4, further comprising:
   determining an expected occupancy at the first location, the expected occupancy comprising an expectancy that the first location will remain unoccupied for a threshold period of time, wherein transporting the package is based at least in part on determining the expected occupancy.

6. The method of claim 5, wherein the expected occupancy is based at least in part on a schedule for one or more occupants of the first location.

7. The method of claim 1, wherein receiving information regarding the delivery of the package further comprises receiving of a height of the package, a length of the package, a width of the package, an estimated weight of the package, a volume of the package, an identification of the package, an image of the package, information associated with a current location of the package, or a combination thereof.

8. The method of claim 1, further comprising:
   retrieving one or more identifying details associated with the package from the received information;
   capturing an image of the package;
   comparing the captured image with the one or more retrieved identifying details associated with the package; and
   identifying the package at the first location based at least in part on the comparing.

9. The method of claim 1, further comprising:
   determining the drop-off location for the package based at least on a name on the package, a type of one or more items delivered, a code on the package, tracking information, instructions from the first device, instructions from an occupant of the first location, or a combination thereof.

10. The method of claim 1, further comprising:
    identifying a secured area within the first location as the drop-off location;
    deactivating at least a portion of a home automation system at the first location;
    transporting the package to the secured area within the first location; and
    reactivating at least the portion of the home automation system at the first location.

11. A method for security or automation systems, comprising:
    determining, at a first device, information regarding a delivery of a package to a first location;
    determining that a mobile robotic device and the first device are part of a predetermined group of devices operating in a neighborhood network based at least in part on receiving the information regarding the delivery of the package;
    determining that the mobile robotic device is wirelessly networked with the first device when the mobile robotic device is within a predetermined distance of the first device or that the mobile robotic device is at a predetermined location based at least in part on determining that the mobile robotic device and the first device are operating in the neighborhood network;
    generating a request to transport the package to a drop-off location based at least in part on determining that the mobile robotic device is wirelessly networked with the first device when the mobile robotic device is within the predetermined distance of the first device or that the mobile robotic device is at the predetermined location; and
    transmitting the request to the mobile robotic device.

12. The method of claim 11, wherein the first device comprises a stationary device associated with a home automation system at the first location and the mobile robotic device comprises an unmanned air vehicle.

13. The method of claim 11, further comprising:
    detecting a person having the package at the first location;
    detecting, via one or more sensors of the first device, the package being delivered at the first location; and
    generating the request to transport the package based at least in part on detecting the package being delivered.

14. The method of claim 13, further comprising:
    capturing at least one image of the person placing the package in the first location; and
    including the at least one image in the request to transport the package to the drop-off location.

15. The method of claim 11, further comprising:
    determining a location of an occupant of the first location; and
    upon determining the location of the occupant is beyond a predefined distance from the first location, automatically generating the request to transport the package to the drop-off location.

16. An apparatus for security and/or automation systems, comprising:
- a processor;
- memory in electronic communication with the processor; and
- instructions stored in the memory, the instructions being executable by the processor to:
- receive, from a first device, information regarding a delivery of a package to a first location;
- determine that a mobile robotic device and the first device are part of a predetermined group of devices operating in a neighborhood network based at least in part on receiving the information regarding the delivery of the package;
- determine that the mobile robotic device is wirelessly networked with the first device when the mobile robotic device is within a predetermined distance of the first device or that the mobile robotic device is at a predetermined location based at least in part on determining that the mobile robotic device and the first device are operating in the neighborhood network;
- transport, by the mobile robotic device, the package to a drop-off location based at least in part on determining that the mobile robotic device is wirelessly networked with the first device when the mobile robotic device is within the predetermined distance of the first device or that the mobile robotic device is at the predetermined location; and
- initiate a notification for the first device based at least in part on transporting the package.

17. The apparatus of claim 16, wherein the first device comprises a stationary device associated with a home automation system at the first location and the mobile robotic device comprises an unmanned air vehicle.

18. The apparatus of claim 16, wherein the instructions are further executable by the processor to:
- receive, from the first device, a request to transport the package to the drop-off location, wherein transporting the package is based at least in part on receiving the request.

19. The apparatus of claim 18, wherein the instructions are further executable by the processor to:
- receive data related to occupancy at the first location; and
- determine to transport the package to the drop-off location based at least in part on the received data, wherein transporting the package is based at least in part on determining to transport the package.

20. The apparatus of claim 19, wherein the instructions are further executable by the processor to:
- determine an expected occupancy at the first location, the expected occupancy comprising an expectancy that the first location will remain unoccupied for a threshold period of time, wherein transporting the package is based at least in part on determining the expected occupancy.

* * * * *